US012641665B2

(12) United States Patent
Shahmohammadian et al.

(10) Patent No.: US 12,641,665 B2
(45) Date of Patent: May 26, 2026

(54) TCI FRAMEWORK FOR MULTI-TRP TRANSMISSION

(71) Applicant: Samsung Electronics Co., Ltd., Suwon-si (KR)

(72) Inventors: Hoda Shahmohammadian, San Diego, CA (US); Jung Hyun Bae, Naperville, IL (US)

(73) Assignee: Samsung Electronics Co., Ltd. (KR)

( * ) Notice: Subject to any disclaimer, the term of this patent is extended or adjusted under 35 U.S.C. 154(b) by 248 days.

(21) Appl. No.: 18/214,520

(22) Filed: Jun. 26, 2023

(65) Prior Publication Data

US 2024/0040652 A1 Feb. 1, 2024

Related U.S. Application Data

(60) Provisional application No. 63/393,772, filed on Jul. 29, 2022, provisional application No. 63/408,086, (Continued)

(51) Int. Cl.
*H04W 72/12* (2023.01)
*H04W 72/11* (2023.01)
(Continued)

(52) U.S. Cl.
CPC ............ *H04W 76/20* (2018.02); *H04W 72/11* (2023.01); *H04W 72/1273* (2013.01); *H04W 72/232* (2023.01)

(58) Field of Classification Search
CPC . H04W 76/20; H04W 72/11; H04W 72/1273; H04W 72/232; H04W 72/231; H04W 72/0457; H04B 7/022; H04B 7/063; H04B 7/0695; H04B 7/06968; H04B 7/0413; H04L 5/0053
See application file for complete search history.

(56) References Cited

U.S. PATENT DOCUMENTS

2021/0014931 A1 1/2021 Noh et al.
2021/0112561 A1 4/2021 Zhou et al.
(Continued)

FOREIGN PATENT DOCUMENTS

EP 4231688 A1 8/2023
WO 2021090204 A1 5/2021
(Continued)

OTHER PUBLICATIONS

European Extended Search Report for Application No. 23186276.4, mailed Apr. 22, 2024.
(Continued)

*Primary Examiner* — Lan-Huong Truong
(74) *Attorney, Agent, or Firm* — Renaissance IP Law Group LLP

(57) ABSTRACT

A system and a method are disclosed for communicating with multiple transmission and reception points (multi-TRPs). According to an embodiment, the method includes maintaining a current transmission configuration indicator (TCI) state set including one or more activated TCI states; receiving TCI state information specifying an indicated TCI state set including one or more of the activated TCI states; and updating the current TCI state set based on the indicated TCI state set.

24 Claims, 20 Drawing Sheets

Related U.S. Application Data filed on Sep. 19, 2022, provisional application No. 63/425,301, filed on Nov. 14, 2022, provisional application No. 63/457,096, filed on Apr. 4, 2023.

(51) Int. Cl.

| | |
|---|---|
| *H04W 72/1273* | (2023.01) |
| *H04W 72/232* | (2023.01) |
| *H04W 76/20* | (2018.01) |

(56) References Cited

U.S. PATENT DOCUMENTS

| | | | |
|---|---|---|---|
| 2021/0360594 A1* | 11/2021 | Park | H04B 7/06952 |
| 2022/0053544 A1 | 2/2022 | Kang et al. | |
| 2022/0116256 A1 | 4/2022 | Shahmohammadian et al. | |
| 2022/0132543 A1 | 4/2022 | Bai et al. | |
| 2022/0217695 A1 | 7/2022 | Liou et al. | |
| 2022/0225338 A1 | 7/2022 | Zhu et al. | |
| 2022/0263616 A1 | 8/2022 | Farag et al. | |
| 2022/0278787 A1 | 9/2022 | Liu et al. | |
| 2023/0078059 A1 | 3/2023 | Zhang et al. | |
| 2023/0269041 A1* | 8/2023 | Rong | H04B 7/0695 |
| | | | 370/329 |
| 2023/0291525 A1 | 9/2023 | Zhou et al. | |
| 2024/0163065 A1 | 5/2024 | Sun et al. | |
| 2024/0188015 A1 | 6/2024 | Comsa et al. | |
| 2024/0214035 A1 | 6/2024 | Nilsson et al. | |
| 2024/0429986 A1* | 12/2024 | Bai | H04L 1/1896 |
| 2025/0193889 A1* | 6/2025 | Muruganathan | H04L 5/0023 |
| 2025/0226956 A1* | 7/2025 | Li | H04W 72/54 |
| 2025/0254748 A1 | 8/2025 | Matsumura et al. | |

FOREIGN PATENT DOCUMENTS

| | | |
|---|---|---|
| WO | 2022052954 A1 | 3/2022 |
| WO | 2022077443 A1 | 4/2022 |
| WO | 2022079813 A1 | 4/2022 |

OTHER PUBLICATIONS

European Extended Search Report for Application No. 23186299.6, mailed Apr. 22, 2024.

Moderator (OPPO), "FL Summary for Multi-TRP/Panel Transmission," 3GPP TSG RAN WG1 #100bis, e-Meeting, Apr. 20-30, 2020, 7.2.6.2, Discussion and Decision, 2020, 34 pages.

Moderator (OPPO), "Summary of [104-e-NR-eMIMO-04] Email Discussion," 3GPP TSG RAN WG1 #104-e, e-Meeting, Jan. 25-Feb. 5, 2021, 7.2.6, Discussion and Decision, 2021, 24 pages.

Vivo, "Remaining Issues on Multi-TRP Operation," 3GPP TSG RAN WG1 #102-e, e-Meeting, Aug. 17-28, 2020, 7.2.6, Discussion and Decision, 2020, 12 pages.

European Partial Search Report for Application No. 23186276.4, mailed Dec. 22, 2023.

European Partial Search Report for Application No. 23186299.6, mailed Dec. 22, 2023.

Office Action for U.S. Appl. No. 18/214,517, mailed Aug. 28, 2025.

Final Office Action for U.S. Appl. No. 18/214,517, mailed Apr. 7, 2026.

* cited by examiner

Maintaining a current transmission configuration indicator (TCI) state set including one or more activated TCI states Receiving TCI state information specifying an indicated TCI state set including one or more of the activated TCI states Updating the current TCI state set based on the indicated TCI state set

1601

1602

1603

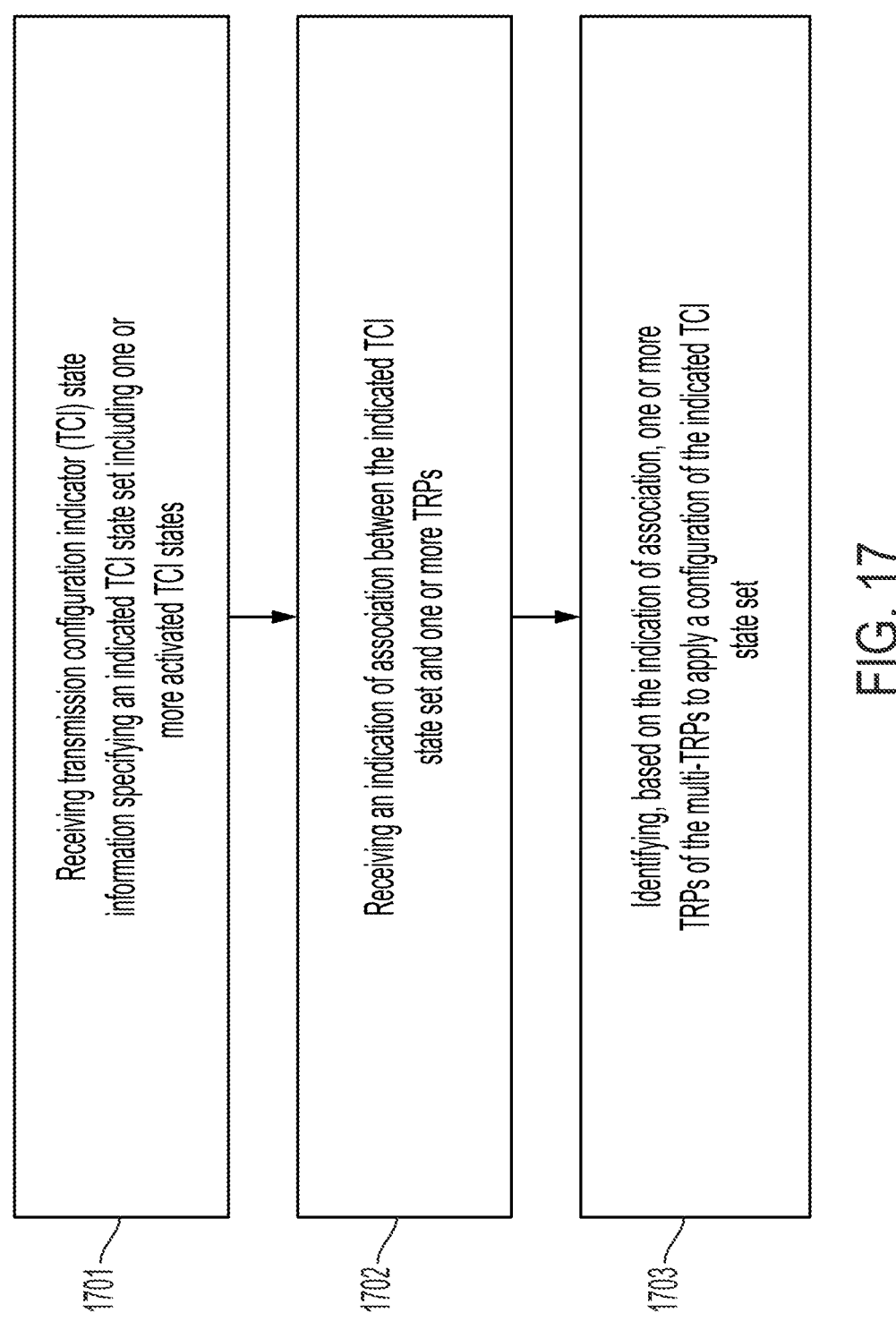

1701 Receiving transmission configuration indicator (TCI) state information specifying an indicated TCI state set including one or more activated TCI states 1702 Receiving an indication of association between the indicated TCI state set and one or more TRPs 1703 Identifying, based on the indication of association, one or more TRPs of the multi-TRPs to apply a configuration of the indicated TCI state set

FIG. 17

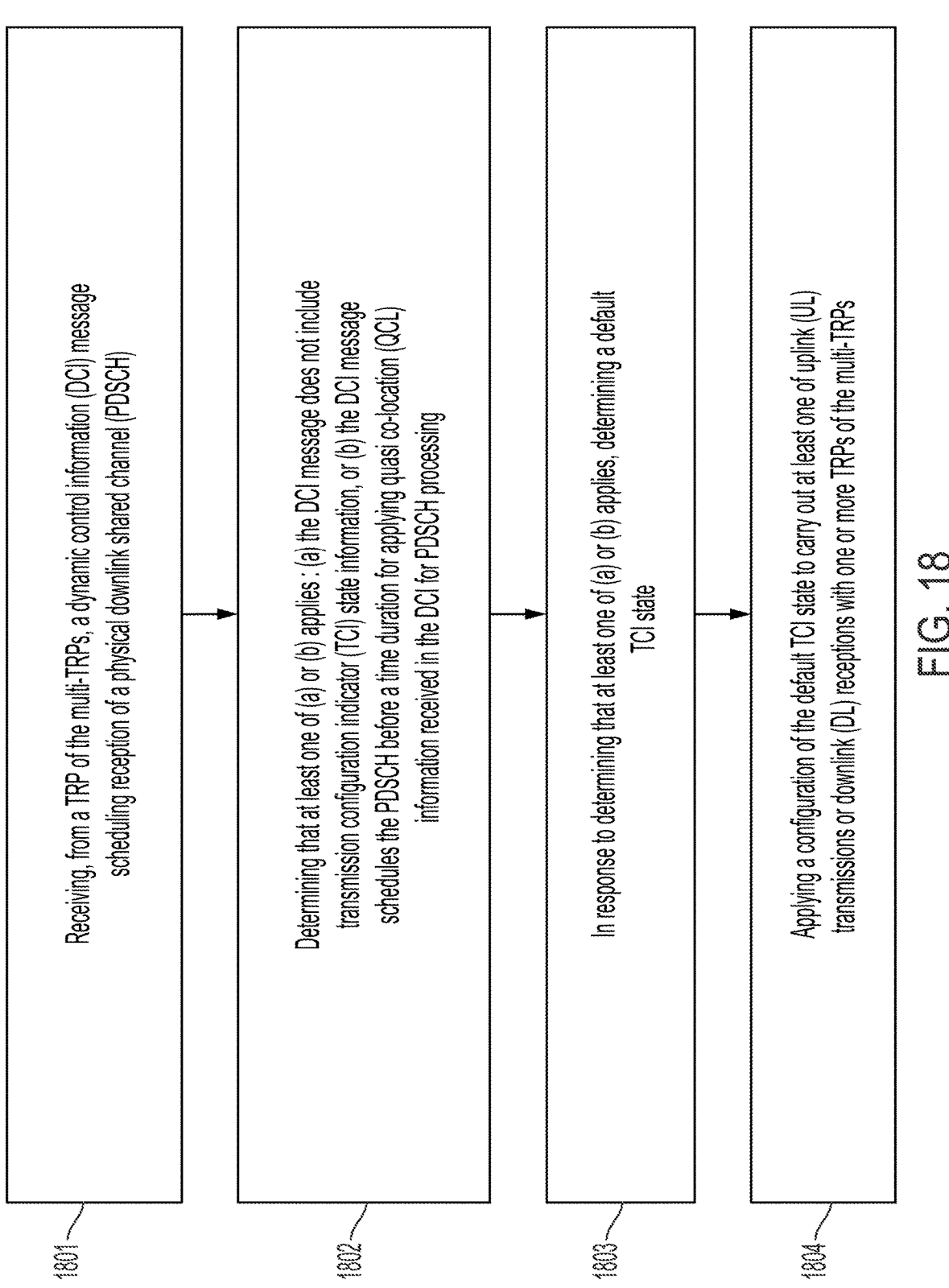

1801 Receiving, from a TRP of the multi-TRPs, a dynamic control information (DCI) message scheduling reception of a physical downlink shared channel (PDSCH)

1802 Determining that at least one of (a) or (b) applies : (a) the DCI message does not include transmission configuration indicator (TCI) state information, or (b) the DCI message schedules the PDSCH before a time duration for applying quasi co-location (QCL) information received in the DCI for PDSCH processing 1803 In response to determining that at least one of (a) or (b) applies, determining a default TCI state 1804 Applying a configuration of the default TCI state to carry out at least one of uplink (UL) transmissions or downlink (DL) receptions with one or more TRPs of the multi-TRPs

FIG. 18

TCI FRAMEWORK FOR MULTI-TRP TRANSMISSION

CROSS-REFERENCE TO RELATED APPLICATION

This application claims the priority benefit under 35 U.S.C. § 119(e) of U.S. Provisional Application No. 63/393,772, filed on Jul. 29, 2022, U.S. Provisional Application No. 63/408,086, filed on Sep. 19, 2022, U.S. Provisional Application No. 63/425,301, filed on Nov. 14, 2022, and U.S. Provisional Application No. 63/457,096, filed on Apr. 4, 2023, the disclosures of which are incorporated by reference in their entirety as if fully set forth herein.

TECHNICAL FIELD

The disclosure generally relates to wireless communication. More particularly, the subject matter disclosed herein relates to improvements to cellular communication with multiple transmission and reception points (multi-TRPs).

SUMMARY

The 3rd Generation Partnership Project (3GPP) is a collaborative project between a group of telecommunications associations with the initial goal of developing globally applicable standards and specifications for third-generation (3G) mobile systems. In Release 17 ("Rel. 17") of its specifications, the 3GPP specified a unified transmission configuration indicator (TCI) framework for configuring and signaling transmission parameters for different reference signals and scenarios between a user equipment (UE) and a single transmission and reception point (TRP), which is an a antenna array (with one or more antenna elements) located at a specific geographical location. A UE may be any device, such as a smartphone, used directly by an end-user to communicate with a base station, or node, such as a Next Generation NodeB (gNB), in a cellular network. The node may be connected to and communicate wirelessly with the UE through one or more TRPs. Transmissions between the UE and the base station via a single TRP may be characterized as single-TRP transmissions, and transmissions between the UE and the base station via multiple TRPs may be characterized as multi-TRP transmissions. Multi-TRP transmissions generally have several advantages over single-TRP transmissions, such as increased downlink (DL) data rate (particularly for UEs that are closer to the radio cell-edge) and increased communication reliability.

The unified TCI framework aims to reduce latency and overhead of beam indication and thereby enhance system performance, especially in high mobility scenarios. One way the unified TCI framework simplifies signaling is by allowing the base station to indicate the transmission parameters for different reference signals using a single TCI field in the downlink control information (DCI). The TCI field can select a TCI state that is associated with a source reference signal (e.g., synchronization signal block (SSB), channel state information reference signal (CSI-RS) or sounding reference signal (SRS)) and a quasi co-location (QCL) type. The QCL type specifies how the transmission parameters of the source reference signal can be applied to other reference signals that are quasi co-located with the source reference signal. For example, the base station can signal a TCI state that indicates the beamforming parameters for CSI-RS and how they can be applied to a physical downlink shared channel (PDSCH), physical downlink control channel (PDCCH), etc.

While Rel. 17 specifies a unified TCI framework for single-TRP transmissions, it does not specify a unified TCI framework for multi-TRP transmissions. As such, there exists a need for the systems and methods disclosed herein to provide a corresponding unified TCI framework for multi-TRP transmissions.

In some embodiments, a method comprises: maintaining a current transmission configuration indicator (TCI) state set including one or more activated TCI states; receiving TCI state information specifying an indicated TCI state set including one or more of the activated TCI states; and updating the current TCI state set based on the indicated TCI state set.

In some embodiments, a system comprises a UE device including a processor and a memory including instructions which, when executed by the processor, cause the UE device to: maintain a current transmission configuration indicator (TCI) state set including one or more activated TCI states; receive TCI state information specifying an indicated TCI state set including one or more of the activated TCI states; and update the current TCI state set based on the indicated TCI state set.

BRIEF DESCRIPTION OF THE DRAWING

In the following section, the aspects of the subject matter disclosed herein will be described with reference to exemplary embodiments illustrated in the figures, in which:

FIGS. 16, 17, and 18 illustrate example methods of communication between a UE and multi-TRPs, according to embodiments.

DETAILED DESCRIPTION

Figure 1:
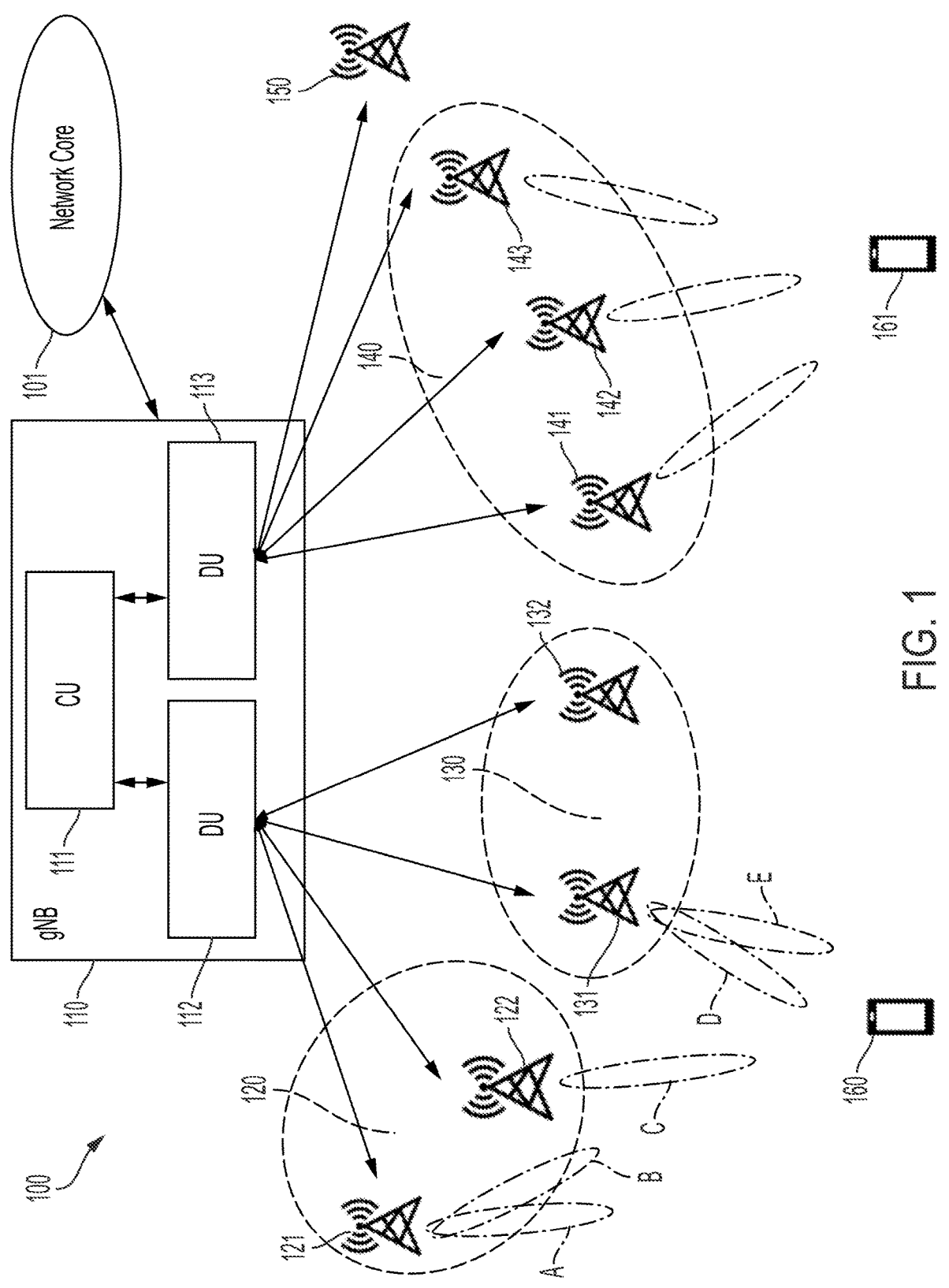
FIG. 1 illustrates an example wireless communications architecture, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "predetermined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 illustrates an example wireless communications architecture 100 in which a UE communicates with a gNB 110 via one or more TRPs (121, 122, 131, 132, 141, 142, 143, 150), according to an embodiment. The gNB may be a $5^{th}$ Generation (5G) radio node that connects the UEs (160, 161), which may include 5G New Radio (NR) devices, to a 5G Network Core 101 using an NR radio interface. The gNB includes a centralized unit (CU) 111 and distributed units (DUs) 112 and 113. The CU 111 generally supports protocols in the higher layers, and the DUs generally support protocols in the lower layers.

Each DU may support one or more cells (120, 130, 140) in the physical layer, and each cell may be associated with a unique physical cell ID (PCI). The TRPs 121 and 122 are part of a cell 120, the TRPs 131 and 132 are part of a cell 130, and the TRPs 141, 142, and 143 are part of a cell 140. The UEs may communicate with the gNB through one or more TRPs associated with one or more cells. For example, the UE 160 communicates with the TRPs 121, 122, and 131 that are part of the cells 120 and 130, and the UE 161 communicates with the TRPs 141, 142, and 143 that are part of the cell 140. Utilizing a cell selection process, the UE 160 may determine that the cell 130 provides optimal communications with the gNB and denote the cell 130 a serving cell. Communications between a UE and TRPs associated with a serving cell may be referred to as "intra-cell" communications, and communications between the UE and TRPs associated with a non-serving cell may be referred to as "inter-cell" communications.

As shown in FIG. 1, the UE 160 communicates with the TRP 131 via wireless signal beams D and E, one beam for DL and one beam for uplink (UL); similarly, UE 160 communicates with the TRP 121 via wireless signal beams A and B. Differently, the UE 160 communicates with the TRP 122 via a single wireless signal beam C for both DL and UL. The gNB is generally responsible for beam management and beam indication. For example, the gNB determines whether a same or different signal beams are used for UL and DL transmissions between the UE and the TRP, based on channel conditions and/or other constraints, such as maximum permitted exposure (MPE) limits, and communicates the determination to the UE, for example, as a TCI state information in a DCI. When the gNB schedules multi-TRP transmissions with the UE, the gNB may operate in single-DCI scheme to schedule the UE using the same DCI for multiple TRPs or operate in multi-DCI scheme to schedule the UE using independent DCIs from each TRP.

Up to Rel. 17, the beam management and beam indication procedures may be separately configured for each channel or reference signals (RS) according to their performance objectives. However, different beam management and beam indication procedures for different channels or RSs would increase the complexity, overhead, and latency and would lead to significant throughput degradation especially for high mobility scenarios and/or Frequency Range 2 (FR2) scenarios with a large number of configured TCI states. Thus, in Rel. 17, a unified TCI framework was specified for single TRP transmission in which a single joint DL/UL TCI state or a single pair of DL and UL TCI states is indicated for UE-dedicated reception on PDCCH/PDSCH or dedicated physical uplink control channel (PUCCH) and dynamic-grant/configured-grant based PUSCH resources. The joint DL/UL TCI state may be used when beam correspondence between DL and UL is assumed, and the pair of DL and UL TCI states may be used when beam correspondence is not assumed (e.g. MPE event).

Unified TCI state pools may be configured via higher-layer signaling for each bandwidth part (BWP)/component carrier (CC). In general, TCI states for DL and UL transmission may be configured from separate pools, although in case of joint DL/UL TCI states, the same DL TCI state pool may be shared for UL transmissions, as well. That is, the unified TCI state may be either a joint DL/UL TCI state (i.e. JointULDL type), which means the serving cell is configured with a single pool for both DL and UL operations (DLorJoint-TCIState-r17), or a pair of separate DL and UL TCI states (i.e. separateULDL type), which means the serving cell may be configured with two pools, one pool for DL operation (DLorJoint-TCIState-r17) and one pool for UL operation (UL-TCIState-r17). The maximum number of configured TCI states for the joint DL/UL TCI state pool may be 128 per BWP per CC, and the number of configured TCI states a UE can support for DL and UL operations may be a UE capability including candidate values of 64 and 128 for DL and 32 and 64 for UL per BWP per CC.

The supported target channels and RSs in the Rel. 17 unified TCI framework for DL transmissions that would share the same indicated unified TCI state may be UE-dedicated PDCCH/PDSCH, non-UE-dedicated PDCCH/PDSCH associated with the serving cell PCI, aperiodic CSI-RS resources for CSI and aperiodic CSI-RS resources for beam management. Periodic and semi-persistent CSI-RS resources may be excluded from supported target RSs for DL to allow beam measurement and CSI reporting for different candidate beams before switching to those beams as unified TCI states. TCI states of periodic and semi-persistent CSI-RS resources may be configured by radio resource control (RRC) and medium access control (MAC) control element (CE). For the supported target CSI-RS resources (e.g., aperiodic CSI-RS for beam management and aperiodic CSI-RS for CSI acquisition), the absence of qcl-info field for aperiodic CSI-RS inside CSI-AssociatedReportConfigInfo (where the QCL information for an aperiodic resource may be configured as in up to Rel. 17 specification) may be an implicit determination to apply the indicated unified TCI state to that supported target RS.

For the supported target SRS resources (e.g., aperiodic SRS for beam management or SRS of any time-domain behavior for codebook, non-codebook, and antenna switching), a one-bit parameter followUnifiedTCI-State-r17 may be RRC configured at the SRS set level configuration to determine application of the indicated unified TCI state to that supported target SRS. For all other supported UL target channels including PUCCH and DG/CG PUSCH, the UE may follow the indicated unified TCI state if they belong to BWP/CC that may be configured with unified TCI state.

The signaling medium that is used to update unified TCI state may be a UE-specific DCI with or without PDSCH assignment. The unified TCI state may be indicated by a codepoint value in a TCI field of DCI format 1_1 or 1_2, wherein the codepoint value maps to one or more activated unified TCI states (e.g., up to 8 activated states) activated by MAC CE command. Each of codepoint values may be mapped to a joint DL/UL TCI state, a pair of DL and UL TCI states, a DL-only TCI state for separate DL/UL TCI states, or a UL-only TCI state for separate DL/UL TCI states. The UE may acknowledge the unified TCI state update through the same acknowledgement (ACK)/negative-acknowledgement (NACK) transmission for the scheduling the DL DCI and apply the new indicated unified TCI state at least Y symbols after the last symbol of the transmitted ACK, wherein Y may be determined based on the carrier with the smallest subcarrier spacing (SCS).

The Rel. 17 unified TCI framework supports common TCI state ID update and activation across a set of configured CCs/BWPs, at least for UE-dedicated PDCCH/PDSCH and/or UE-dedicated PUSCH/PUCCH. To do so, a list of serving cells may be RRC configured, and the TCI relation of those cells may be updated simultaneously with a MAC CE command. Furthermore, the Rel. 17 unified TCI framework supporting common TCI state across a set of configured CCs allows sharing a single RRC TCI state pool among those configured CCs. For such a CC list, RRC-configured TCI state pools may be absent in the PDSCH configuration for each BWP/CC and be replaced with a reference to RRC-configured TCI state pools in a reference BWP/CC.

The Rel.17 unified TCI framework may be applicable to both intra-cell and inter-cell transmission scenarios. That is, activated Rel.17 unified TCI states may be directly or indirectly associated with PCI(s) different from the serving cell PCI. To illustrate, a secondary synchronization signal block (SSB) indicated as a UL source RS in unified TCI state may be associated with a PCI different from the serving cell PCI (directly), or CSI-RS resources indicated as a source RS in unified TCI state may be quasi co-located with a SSB from a different physical cell than serving cell (indirectly). For inter-cell transmission scenarios, the UE may support more than one Rel.17 active DL TCI states per band (i.e. multiple TCI state codepoint values may be activated by a MAC CE command that is followed by a DCI indication of a single codepoint value). If the UE does not support such capability, the DCI-based unified TCI indication may be not supported for that UE, and MAC CE beam indication (i.e., activation of a single unified TCI state codepoint by MAC CE) may be used to switch between two different DL receptions along two different beams.

Application of the indicated unified TCI state to PDCCH and the respective PDSCH reception may be determined per control resource set (CORESET) RRC configuration. In some cases, the UE would apply the indicated unified TCI state for PDCCH and PDSCH reception, such as for CORESETs associated with only UE-dedicated reception (other than CORESET #0). For a PDCCH and the respective PDSCH reception on CORESET #0, whether to apply the indicated Rel.17 unified TCI state to CORESETs associated with only non-UE-dedicated reception or CORESETs associated with both UE-dedicated and non-UE-dedicated reception in a CC may be determined per CORESET by RRC configuration. For dynamic grant (DG) PDSCH scheduled by the CORESET, the UE may apply the indicated unified TCI state according to the CORESET RRC configuration. For SPS PDSCH, the UE may apply the indicated unified TCI state according to the CORESET configuration of the activation DCI. That is, a DB-based or SPS-based PDSCH transmission may entirely follow the indication of the corresponding CORESET to determine whether or not to apply the indicated unified TCI state.

In the Rel. 17 unified TCI state framework, each DCI indicates the upcoming unified TCI state to be used in a time window manner (e.g., after a beam application time), and this may not necessarily be related to the TCI state of the scheduled PDSCH. That is, except for the very first unified TCI state indication, defining a default TCI state was less important in Rel. 17 since the UE would apply the previously indicated and currently active unified TCI at each time instance. However, using per CORESET RRC configuration as an indication of whether or not to apply the indicated unified TCI may create beam ambiguity scenarios at the UE and, thus, compel defining a default TCI rule definition for Rel. 17 unified TCI state.

Beam application time may be defined as the first slot to apply the indicated unified TCI at least Y symbols after the last symbol of the acknowledgment of the corresponding DCI. The Y symbols may be configured per DL and UL BWP by the gNB based on UE capability and may be determined based on the carrier with the smallest SCS among the carrier(s) applying the beam indication. The configured value range of RRC parameter for beam application time is 1, 2, 4, 7, 14, 28, 42, 56, 70, 84, 98, 112, 224 and 336 symbols. If only a single TCI codepoint is activated by MAC CE command, beam application time may follow the Rel. 16 application timeline of MAC CE activation.

After the UE receives a higher-layer configuration of unified TCI states, such via RRC configuration, and before application of an indicated TCI state from the configured TCI states, the UE assumes that DL target channels may be quasi co-located with the SSB identified during the initial access procedure, and UL target channels assume the same UL spatial filter as that for a PUSCH transmission scheduled by a random access response (RAR) UL grant during the initial access procedure.

According to some embodiments, the present disclosure provides a unified TCI state framework for multi-TRP operations. In particular, the present disclosure describes aspects of the framework including: (1) QCL relation applicability and considerations, (2) Signaling mechanism of the unified TCI sates, (3) TCI state/TRP association, (4) beam application time definition, (5) default beam considerations, (6) dynamic switching between single-TRP and multi-TRP operations, (7) Unified TCI state for CG/SPS-based transmission, and (8) beam failure recovery (BFR) mechanism with unified TCI state.

QCL Relation Applicability and Considerations

For DL transmission, the supported source RS for unified TCI multi-TRP transmission may include CSI-RS for tracking, CSI-RS for beam management, and CSI-RS for CSI. For UL transmission, the supported resource RS for unified TCI multi-TRP transmission may include SSB, CSI-RS and SRS, without being restricted to beam management usage. In some embodiments, SSB and SRS may be excluded from the source RS list for DL transmission.

In some embodiments, the maximum number of configured TCI states in multi-TRP transmission for joint DL/UL TCI state may be 128 per BWP per CC, and candidate values for the number of configured TCI states may be 64 and 128 for DL and 32 and 64 for UL per BWP per CC. Joint DL/UL TCI states may share the same pool, while a separate pool may be configured for UL TCI states. Furthermore, multiple sub-pools may be configured inside each of joint/DL pool as well as UL pool corresponding to different TRPs. Each sub-pool may contain a group of resources that correspond to transmission to/from a specific TRP and share the same TCI state.

The supported target channels and RS s for multi TRP DL transmission that share the same indicated unified TCI states may be UE-dedicated PDCCH/PDSCH, non-UE-dedicated PDCCH/PDSCH associated with the serving cell PCI, aperiodic CSI-RS resources for CSI and aperiodic CSI-RS resources for beam management. In some embodiments, periodic and semi-persistent CSI-RS resources may be excluded from DL target RS list to allow beam measurement and CSI reporting for different candidate beams before switching to those beams as unified TCI states.

The pathloss RS and power control parameters for target UL channels and RS s may be associated with UL or joint TCI states per BWP via RRC configuration independently for each of the UL channels PUCCH, PUSCH, and SRS. If multiple unified TCI states (e.g., at most one unified TCI state per TRP) may be indicated for multi TRP transmission, then each of indicated UL or joint TCI states may be associated with one set of pathloss RS and power control parameter per BWP per UL target channel corresponding to one specific TRP. If only a single common unified TCI state is indicated for all TRPs in multi TRP transmission, multiple sets of pathloss RS and power control parameters may be associated with that common indicated UL or joint TCI state.

Signaling Mechanism of the Unified TCI States

In some embodiments, a UE-specific DCI (e.g. DCI format 1_1 or 1_2), with or without PDSCH assignment, may be used as a signaling medium update unified TCI states in multi-TRP transmission. The unified TCI states may be indicated by single codepoint in a TCI field of a DCI, where the TCI state/codepoint mapping is provided by MAC CE command. The MAC CE codepoint mapping may associate multiple unified TCI states (e.g., multiple joint DL/UL TCI states or multiple pairs of DL and UL TCI states or a combination of them) with a single codepoint. To illustrate, for a multi-TRP transmission with M TRPs, with single-DCI scheme, up to M unified TCI states may be mapped to one codepoint in MAC CE where there may be $M_1$ joint DL/UL TCI states and $M_2$ pairs of DL and UL TCI states such that $M=M_1+M_2$. With a k-bit TCI field, up to $2^k$ codepoints (i.e. TCI states scenarios) can be signaled in a single DCI transmission representing both single-TRP and multi-TRP transmissions. In some embodiments, there may be multiple TCI fields in the DCI (i.e. one TCI field per TRP) where each TRP's unified TCI state may be indicated by a separate codepoint in its corresponding TCI field of the DCI.

To illustrate, for multi-TRP transmission with M TRPs, with single-DCI scheme, up to M separate codepoints may be indicated in up to M TCI fields in the DCI. The TCI state/codepoint mapping may be provided in MAC CE command. An advantage of such proposed scheme is that DCI interpretation would be easier since each field may be interpreted separately per TRP transmission. In terms of overall available TCI states indications in this scheme, with k-bits per TCI field and two TRPs, a total of up to $2^{2k}$ possible combined codepoints may be signaled only for multi-TRP transmission, but some embodiments may reserve one codepoint as an indicator of single-TRP transmissions to the UE. Hence, multi-TRP transmission can have up to $(2^k-1)^2$ possible combined codepoints and each single-TRP transmission can have up to $2^k-1$ possible codepoints to be signaled. That is, a total of up to $(2^k-1)^2+2(2^k-1)=2^{2k}-1$ combined TCI states scenarios can be signaled in a single-DCI transmission for both single-TRP and multi-TRP transmissions with the proposed scheme of separate TCI field per TRP. Comparing per TRP TCI field scheme with single-TCI field scheme of the same bit length (i.e. 2 k bits), the overall available codepoints to be signaled in the single-TCI field scheme is $2^{2k}$, while the overall available codepoints to be signaled for the per TRP TCI field scheme is $2^{2k}-1$.

In some embodiments of the single-field scheme, a TRP indication/index may be added to each codepoint MAC CE for single-TRP transmissions. As an example, for MAC CE without TRP indication, a TCI state ID_{x,y} for codepoint x may be used. When a codepoint includes two TRPs, two TCI ID's with y=1, and y=2 may present. When a codepoint includes one TRP, only one TCI ID with y=1 may present. However, since there would be no indication regarding associated TRP, some embodiments may add a TRP indication after TCI ID when only one TCI ID is present.

For some embodiments of multi-DCI schemes, each DCI may follow a codepoint mapping design in which each codepoint represents one unified TCI state (e.g., a joint DL/UL TCI state, or a pair of DL and UL TCI states, or a DL-only TCI state or an UL-only TCI state). In some embodiments of a unified design scheme for both single-DCI and multi-DCI schemes in multi-TRP transmission, the indicated codepoint in TCI field of DCI may represent all unified TCI states of a multi-TRP transmission. With this unified solution, a single-TCI state association design may be applicable for both single-DCI and multi-DCI schemes. This unified solution would allow cross TRP beam activation in multi-DCI schemes with no additional DCI overhead, support no TCI field present in some of the DCIs, and facilitate a unified beam application time definition that is the same as that of single-TRP transmission.

Common TCI state update and activation across a set of configured CCs can also be supported for multi-TRP transmission. In such scenario, a source RS for QCL-TypeA or QCL-TypeB may be in the same CC/BWP as the target channel or RS. Furthermore, activated unified TCI states for multi-TRP transmission may be directly or indirectly associated with PCI(s) different from the serving cell PCI, in which case more than one active TCI state per band by UE or dynamic switching of TCI states (e.g. via MAC CE) for inter-cell transmission may be supported.

In some embodiments, application of the indicated unified TCI states to the PDCCH and the respective PDSCH reception in multi-TRP transmission may be determined per CORESET RRC configuration. For single-DCI scheme or the above-proposed unified design scheme for both single-DCI and multi-DCI schemes (i.e., one codepoint is mapped to all TRPs unified TCI states), application of all the multi-TRP unified TCI states to all PDCCHs and PDSCHs reception may be based on RRC configuration of the respective CORESET. For multi-DCI scheme with per TRP unified TCI state indication, the indicated TCI states may be applied individually per TRP based on its own CORESET configuration. In some embodiments, the UE may apply the indicated unified TCI states for the PDCCH and the respective PDSCH reception on a CORESET associated with only UE-dedicated reception (other than CORESET #0).

For any SRS resource or resource set that may be configured as a target signal of a unified TCI state but does not apply that indicated unified TCI state, the UL power control parameter setting including pathloss RS should be derived based on the setting associated with indicated unified TCI for the SRS resource with the lowest ID in that SRS resource set. The pathloss RS and power control parameters (e.g., P0, alpha, closed loop index) for target UL channels and RSs may be associated with UL or joint TCI states per BWP via RRC configuration. Power control parameters settings may be independently configured for each of UL channels PUCCH, PUSCH, and SRS.

TCI State/TRP Association

In some embodiments, an association of the indicated unified TCI states with different TRPs may be used to determine which one of the indicated unified TCI states is applicable to the target channels and RSs of a specific TRP. One semi-static solution applicable to both single DCI and multi DCI schemes, may be based on per TRP resource grouping and sub-pool design context, as explained earlier, where a sub-pool ID may be used as an implicit association of unified TCI states and TRPs. In some embodiments, multiple resource groupings may be defined inside each of a joint/DL pool and a UL pool to represent per TRP sub-pools, and each of those sub-pools may be associated with a sub-pool ID, which can serve as an implicit indication of association between a specific TRP and an indicated unified TCI state.

In some embodiments, unified TCI states/TRP association may be explicitly indicated using semi-static configurations. To illustrate, each target channel and RS may have a specific RRC parameter configuration to indicate association to a specific indicated unified TCI state (or specific TRP). The RRC parameter may use a vector bit or a bitmap structure to indicate the specific indicated unified TCI state to be applied for the target channel and/or RS. An example, for a multi-TRP operation with two TRPs, a two-bit RRC parameter may be configured for each target channel (e.g., PDCCH/PDSCH and/or PUCCH/PUSCH) and/or RS (e.g., CSI-RS and/or SRS). The configured value '01' may represent the first indicated unified TCI state, the configured value '10' may represent the second indicated unified TCI state, and the configured value '11' (or '00') may represent both the first and second indicated unified TCI states to be applied for that target channel and/or RS. The determination of first and second unified TCI states may be based on the order of TCI states indicated in DCI (e.g., in per TRP TCI field scheme), on codepoint mapping in MAC CE (e.g. in one TCI field scheme), or on the order of TCI state IDs.

For SRS as target resource, the new RRC parameter configuration may be added at resource level (similarly to traditional spatialRelationInfo) to indicate implicit or explicit association to a specific indicated unified TCI state or specific TRP. To illustrate, as an explicit approach, the RRC configured association may be indicated through pointing toward a unified TCI state ID. In some embodiments, as an implicit approach, the RRC configured association may be indicated through vector bit or bitmap format indication of the first, second or both unified TCI state(s) (e.g., in two TRPs operation). For CSI-RS as target resource, the new RRC parameter configuration may be added at resource level to indicate implicit or explicit association to a specific indicated unified TCI state or specific TRP. To illustrate, the RRC configured association may be indicated through pointing toward a unified TCI state ID, similarly to qcl-InfoPeriodicCSI-RS for periodic CSI-RS resources, as an explicit approach. In some embodiments, as an implicit approach, the RRC configured association may be indicated through vector bit or bitmap format indication of the first, second, or both unified TCI state(s) (e.g., in two TRPs operation).

In some embodiments, the UE may use a predetermined rule to identify unified TCI states/TRP association such that the order of TCI state ID or order of TCI states in codepoint mapping in MAC CE (e.g., the smallest/largest/specific ID or TCI state) is based on the order of target resource ID. For example, the first indicated unified TCI states may be applied to the target resource with the smallest target resource ID. Another specific approach applicable to single-DCI scheme with repetition is to implicitly associate each indicated unified TCI state to one repetition occasion based on a predetermined rule. For example, the UE may map the indicated unified TCI states to repetition occasions according to the order of TCI state ID or according to order of TCI states in codepoint mapping of MAC CE command. For a multi-DCI scheme, coresetPoolIndex may be used as an implicit association of unified TCI states and TRPs. For example, each of indicated unified TCI state may be activated by MAC CE for a coresetPoolIndex and all scheduled channels and signals by the DCI may also be associated to a particular coresetPoolIndex. Hence, the corresponding TRP for each indicated unified TCI states may be determined based on coresetPoolIndex.

In some embodiments, the gNB may provide the association to the UE in a MAC CE command or in DCI for dynamic TCI state/TRP association configuration and/or update. New fields may be introduced or other existing fields may be reused in DCI or MAC CE to indicate TCI state/TRP association through a vector bit format or bitmap format. Such TCI state/TRP association field may be present in the DCI even with indication of a single unified TCI state in the DCI, which would allow unified TCI state update for the target channels and RSs. For example, if a target SRS/CSI-RS resource is RRC configured to follow the first indicated unified TCI state, a dynamic TCI state association indication in DCI pointing toward the first unified TCI state and a single indicated unified TCI state would update the TCI state of that target resource. The TCI state/TRP association indication in DCI may also implicitly indicate dynamic switching between single-TRP and multi-TRP transmissions.

When the scheduling offset is smaller than timeDurationForQCL threshold, the UE may follow a default TCI state/TRP association to determine if one or multiple unified TCIs are applied for the target channels and RSs including the scheduled PDSCH, and also to determine which TRP (or TCI associated with such a TRP) is applied in the case when one unified TCI is applied. In RAN1 meeting #112, this issue was discussed, and an agreement was reached to address UE behavior for scenarios where either UE supports the capability of two default beams for single DCI based multi TRP transmission or if otherwise the offset between the reception of the scheduling DCI and scheduled PDSCH is assumed to be equal or greater than timeDurationForQCL. However, the agreement does not address the scenario in which the UE does not support the capability of two default beams and the gap between the DCI and scheduled PDSCH is smaller than timeDurationForQCL.

Figure 2:
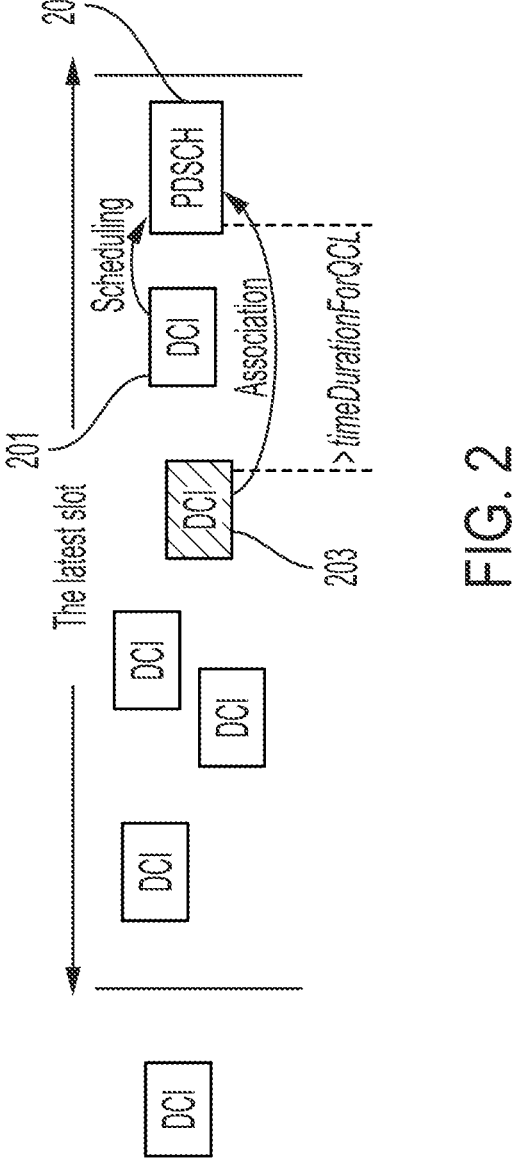
FIGS. 2, 3, 4, 5, 6, 7, 8 and 9 illustrate examples of TCI state/TRP association behavior, according to embodiments.

One possible solution for when the UE does not support the capability of two default beams and the gap between the DCI and scheduled PDSCH is smaller than timeDurationForQCL is to apply a pre-defined rule or RRC indication or MAC CE indication to provide default TRP association. In some embodiments, the default TCI state/TRP association may be defined to follow previously indicated one in a DCI that has been most recently received and/or acknowledged (ACKed) by the UE within a specific/pre-configured time duration in symbols or slots from the scheduled PDSCH, as shown in FIG. 2. The illustrated behavior is to follow the TCI state/TRP association of the most recently received DCI 203 in the latest slot (i.e., the scheduled PDSCH slot) when the offset between the scheduling DCI 201 and the PDSCH of interest 202 is less than timeDurationForQCL, and the offset between a previous DCI 203 is greater than timeDurationForQCL.

Figure 3:
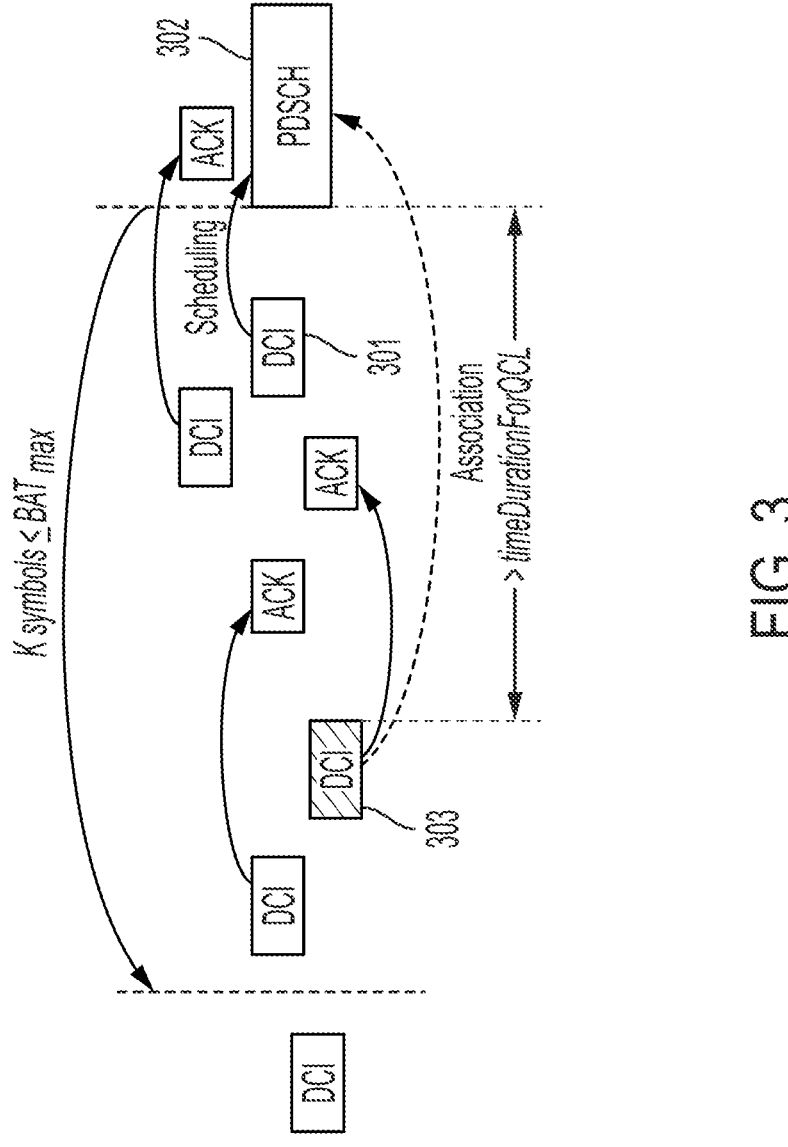

FIG. 3 illustrates another possible association behavior for when the offset between the scheduling DCI 301 and the PDSCH of interest 302 is less than timeDurationForQCL and the offset between a previous DCI 303 is greater than timeDurationForQCL, according to an embodiment. The illustrated behavior is to follow the TCI state/TRP association of the most recently received and ACKed DCI 303 within K symbols before the scheduled PDSCH starting symbol. The value of K may be restricted to be smaller than the maximum beam application time $BAT_{max}$ in unified TCI framework (i.e., $K \le BAT_{max}$) to guarantee the similar indicated unified TCI states for the scheduled PDSCH and that aforementioned most recent DCI. The value of K may be a UE capability.

Figure 4:
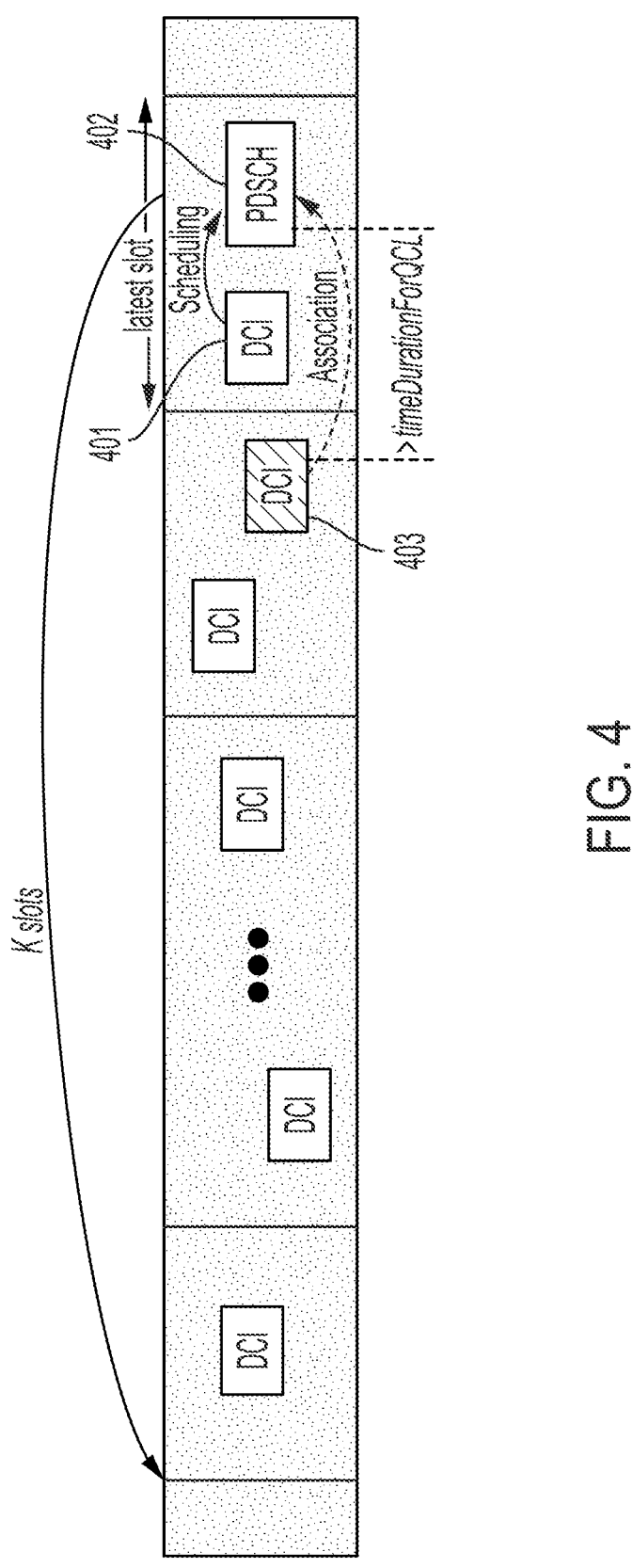

FIG. 4 illustrates another possible association behavior for when the offset between the scheduling DCI 401 and the PDSCH of interest 402 is less than timeDurationForQCL and the offset between a previous DCI 203 is greater than timeDurationForQCL, according to an embodiment. The illustrated behavior is to follow the TCI state/TRP association of the most recently received and ACKed DCI 403 within K slots before the latest slot (i.e. the scheduled PDSCH slot). The value of K may be a UE capability.

Another possible solution is that the gNB may indicate to the UE a reference CORESET among CORESETs configured within an active BWP of the serving cell monitored by the UE within the same slot as scheduled PDSCH (i.e. latest slot) or any specific/pre-configured time duration in symbols or slots from the scheduled PDSCH. A default TCI state/TRP association may then be determined/provided according to the TCI state association of that reference CORESET. The reference CORESET may be the CORESET closest to the PDSCH starting symbol within the slot. The reference CORESET may be the CORESET with the lowest or a predetermined CORESET ID among CORESETs monitored by the UE in the latest slot. The reference CORESET may be the CORESET with the lowest or a predetermined CORESET ID among CORESETs monitored by the UE in within the a specific/pre-configured time gap (in symbols or slots) from the scheduled PDSCH. That specific/pre-configured time gap may be a UE capability.

When the TCI state/TRP association indication field is not present in DCI, the UE may also need to follow a default TCI state/TRP association. This issue was discussed in RAN1 meeting #112, and an agreement was reached to address the case in which the offset between the reception of the scheduling DCI (e.g., DCI format 1_1/1_2) and the scheduled/activated PDSCH reception is equal to or greater than a threshold. The agreement is also applicable, regardless of threshold, when the UE supports the capability of two default beams for single-DCI based multi-TRP transmission and the TCI state/TRP association indication field (may also be referred to as "TCI selection field") is not present in the DCI. That is, the UE may use both indicated unified TCI states to buffer the received signal before a threshold and apply the agreement rule(s) after the threshold. However, the UE behavior is not addressed when the gap between the DCI and scheduled PDSCH is smaller than timeDurationForQCL and the UE does not support the capability of two default beams for single-DCI based multi-TRP transmission. To address this, our earlier discussion and proposed solutions for default TCI state/TRP association is also applicable to when a TCI state/TRP association indication field is not present in the DCI and the scheduling offset is smaller than timeDurationForQCL threshold. These solutions include using a pre-defined rule, RRC indication or MAC CE indication, following previously indicated association in a DCI that has been most recently received and/or ACKed by UE within a specific/pre-configured time duration in symbols or slots from the scheduled PDSCH, and following association of a reference CORESET among CORESETs monitored by the UE in within a specific/pre-configured time gap (in symbols or slots) from the scheduled PDSCH.

Regarding dynamic switching between single-TRP and multi-TRP transmissions, in some embodiments, the gNB's dynamic switching flexibility may be restricted when the TCI state/TRP association indication field is not present in DCI, and the UE would not expect dynamic switching between single-TRP and multi-TRP transmissions. In some embodiments, the gNB's flexibility of dynamic switching between single and multiple TRP transmissions may not be restricted even when the TCI state/TRP association indication field is not present in DCI, in which case dynamic switching may be implicitly determined by the number of unified TCI states mapped to the codepoint in TCI field. The default TCI state/TRP association can then be determined based on a pre-defined UE behaviour rule as below:

If the current scheduling DCI indicates a codepoint with two unified TCI states, the UE applies both unified TCIs.

If the current scheduling DCI indicates a codepoint with one unified TCI state, one possible solution is that only the first or a pre-configured reference TCI state that is indicated by RRC configuration or MAC CE may be used. For example, the pre-configured reference TCI state may be RRC configured along with an RRC configuration of not having a TCI state association indication field in the DCI. Another flexible alternative solution is to follow a most recent DCI or a reference CORESET (as discussed in details earlier) that indicates one of unified TCI states. To illustrate, the default TCI state/TRP association can be determined/provided according the TCI state association of the lowest or a predetermined CORESET ID among CORESETs that have a single-TCI state association and are monitored by the UE in the latest slot or within a specific/pre-configured time duration from the scheduled PDSCH.

If the current scheduling DCI does not have the TCI state field present, one solution is to apply both unified TCIs. Alternatively, a default TCI state/TRP association may be determined/provided according to a pre-defined or RRC or MAC CE indication of one of the TCI states. Alternatively, the default TCI state/TRP association may be defined to follow the previously indicated one in a DCI that has been most recently received and/or ACKed by UE within a specific/pre-configured time duration in symbols or slots from the scheduled PDSCH. Alternatively, the default TCI state/TRP association may be determined/provided according the TCI state association of the lowest or a predetermined CORESET ID among CORESETs monitored by the UE in the latest slot or within a specific/pre-configured time duration from the scheduled PDSCH.

Any combination of two UE behavior rules (Rule #1 and Rule #2) selected from the rules above may be used to apply the indicated unified TCI state(s) to the scheduled/activated PDSCH corresponding to any of the two following scenarios:

I. UE does not support the capability of two default beams and the gap between the scheduling DCI and scheduled/activated PDSCH is smaller than timeDurationForQCL.

II. UE does not support the capability of two default beams, the gap between the scheduling DCI and scheduled/activated PDSCH is smaller than timeDurationForQCL, and TCI selection field is not present in the scheduling DCI.

Figure 5:
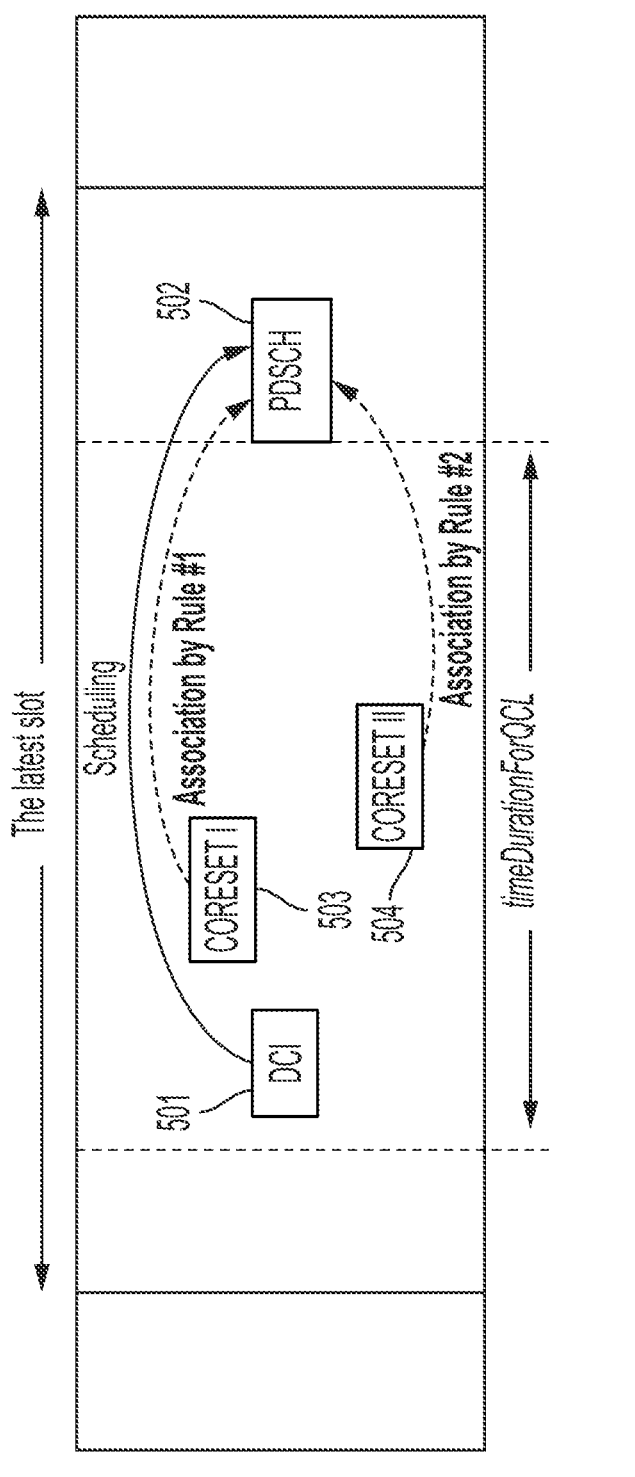

For cases in which Rule #1 is selected to address scenario I and Rule #2 is selected to address scenario II above, this may cause UE behavior ambiguity on how to apply the indicated unified TCI state(s) to the scheduled/activated PDSCH if the granularity of TCI selection field existence is defined as per CORESET. To better illustrate, such UE ambiguity arises as UE can be configured with multiple CORESETs to be monitored within timeDurationForQCL from the start of scheduled PDSCH where each CORESET may be associated with a different existence configuration of the TCI selection field. Thus, the UE would not know which rule (i.e. either Rule #1 or Rule #2) should be applied before finishing decoding the scheduling DCI. That is the rule selection would be tied to CORESET as existence configuration of the TCI selection field is per CORESET. FIG. 5 illustrates an example of the ambiguity that arises the gap between the scheduling DCI 501 and scheduled/activated PDSCH 502 is smaller than timeDurationForQCL and UE does not support the capability of two default beams. There are two CORESETs that UE blindly monitors: CORESET I 503, which has a configuration of TCI selection field 'present', and CORESET II 504, which has a configuration of TCI selection field 'not present.' In this example UE has ambiguity whether to apply Rule #1 or Rule #2 for TCI association of the scheduled PDSCH 502.

Figure 6:
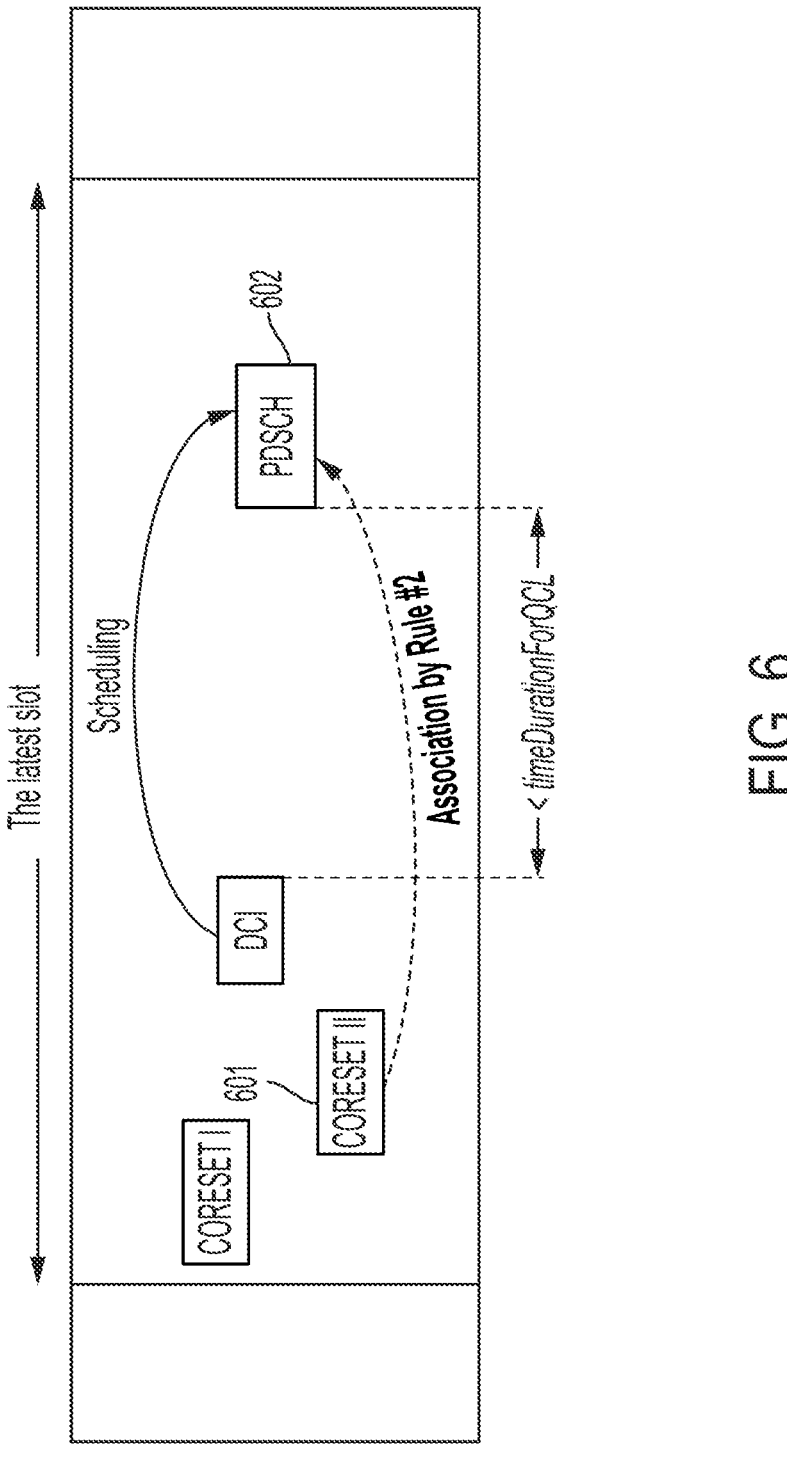
Figure 7:
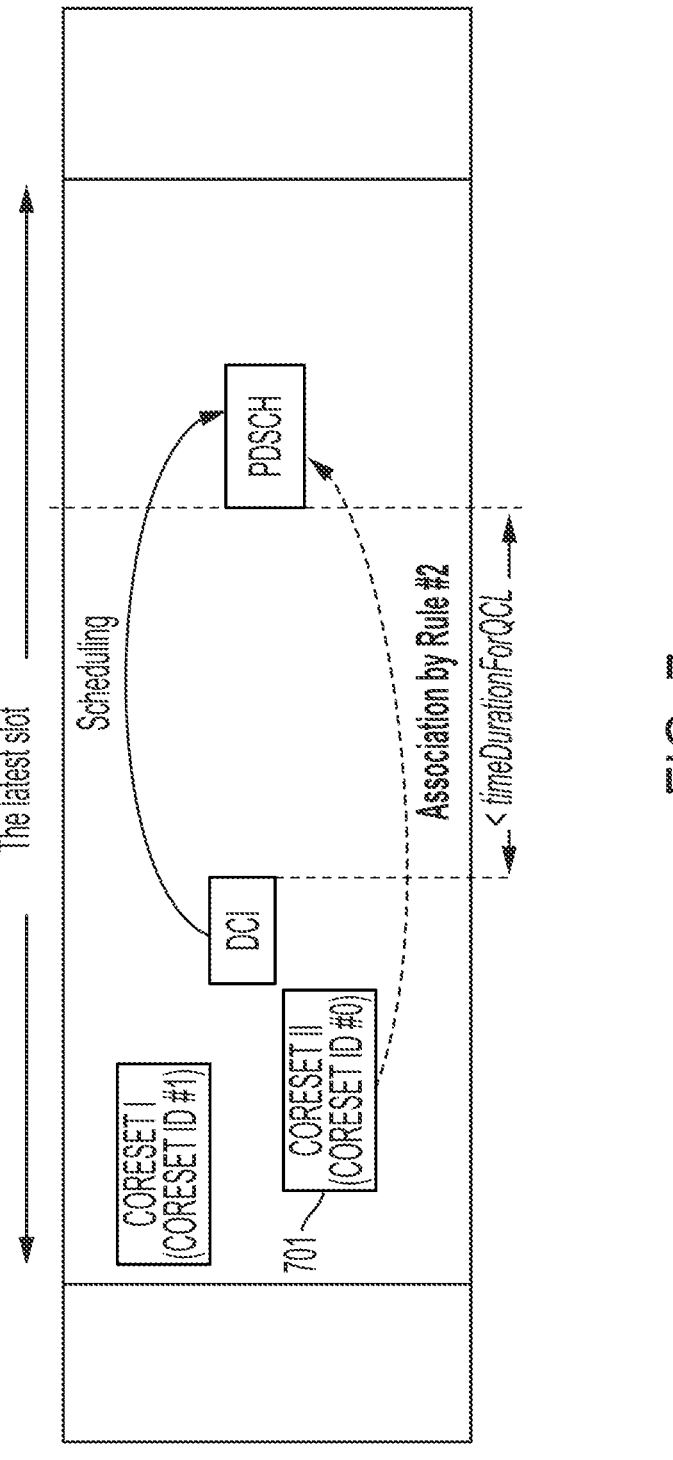
Figure 8:
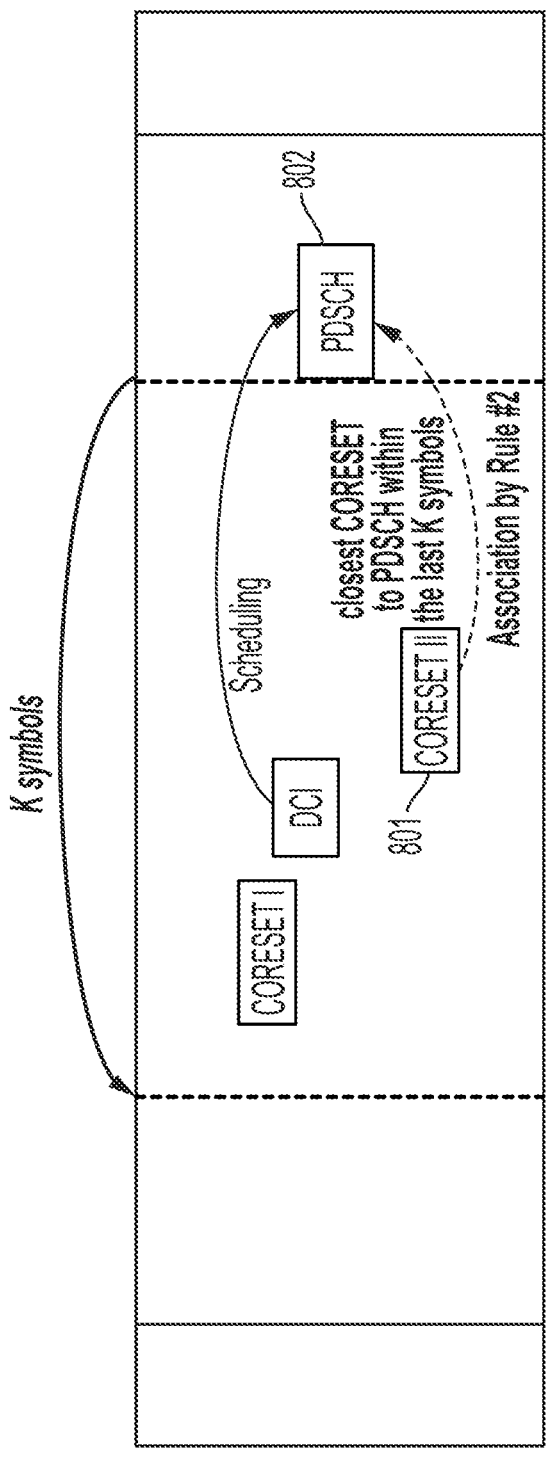
Figure 9:
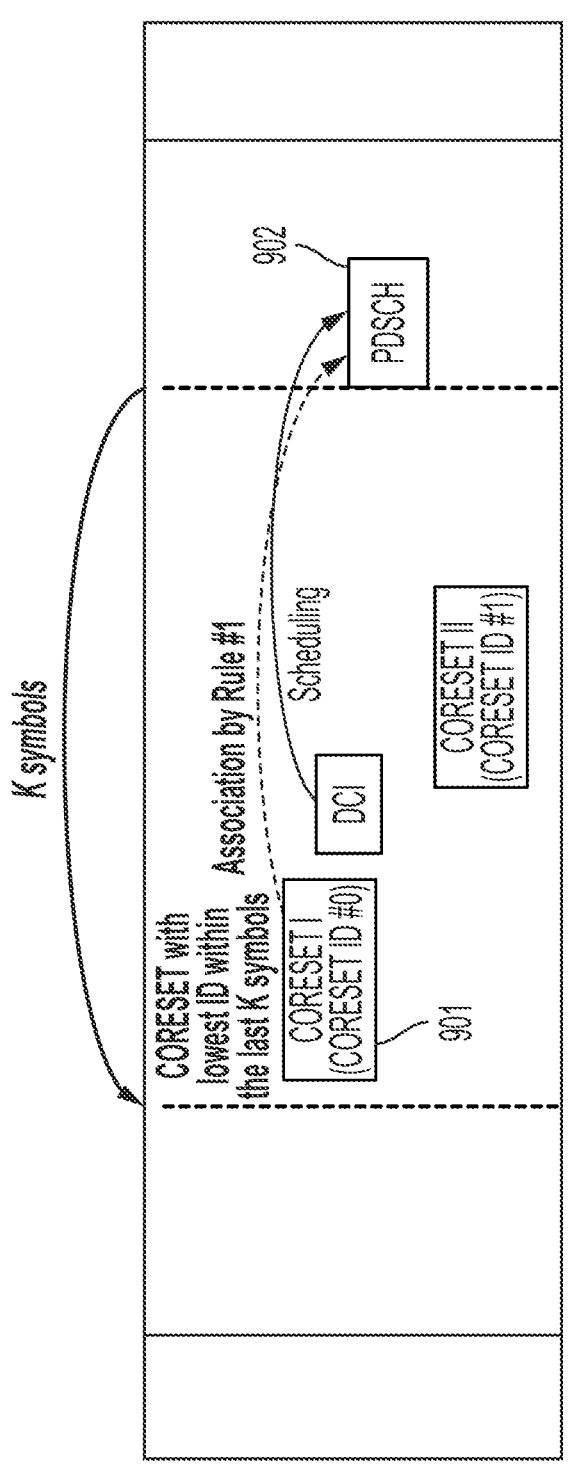

To address such ambiguity, one solution may be to determine the granularity of TCI state selection field existence to be the same for all CORESETs. Another solution is to prevent such multiple-rule behavior and consequent ambiguity by forcing the same UE behavior rule for applying the indicated unified TCI state(s) to the scheduled/activated PDSCH for both of aforementioned scenarios I and II. For example, the gNB may indicate to the UE a reference CORESET among CORESETs configured within the active BWP of the serving cell monitored by the UE within the same slot as scheduled PDSCH (i.e. latest slot) or any specific/pre-configured time duration in symbols or slots from the scheduled PDSCH. A default TCI state/TRP association may then be determined/provided according the TCI state association of that reference CORESET. As shown in FIG. 6, the reference CORESET 601 may be the CORESET closest to the PDSCH 602 starting symbol within the slot. As shown in FIG. 7, the reference CORESET 701 may be the CORESET with the lowest or a predetermined CORESET ID among CORESETS monitored by the UE in the latest slot. As shown in FIG. 8, the reference CORESET 801 may be the closest CORESET to the PDSCH 802 within the last K symbols. As shown in FIG. 9, the reference CORESET 901 may be the CORESET with lowest or predetermined CORESET ID among CORESETS monitored by the UE within a specific/pre-configured time gap (e.g., within K symbols or slots) from the scheduled PDSCH 902 within the last K symbols. In some embodiments, specific/pre-configured time gap may be the timeDurationForQCL instead of K symbols or slots, and the behavior illustrated in FIGS. 6 to 9 may be analogously applied.

In single-DCI based multi TRP transmission, it is possible that one PDSCH and one PDCCH overlap in time domain over one or more symbols. Under previously established behavior, when overlapping PDSCH and PDCCH have the same TCI states, the UE is expected to receive both PDCCH and PDSCH, and when they have different QCL-TypeD in both TCI states, the UE is expected to prioritize the reception of PDCCH. However, there is no established UE behavior for the case in which the PDSCH and PDCCH overlapping in at least one symbol have the same unified TCI states but different TCI state/TRP association. One solution is to prioritize the reception of PDCCH with its corresponding TCI state/TRP association. Another alternative is to priori- tize the reception of PDCCH only for the corresponding transmission occasions of the different associated TCI state(s). To illustrate, consider the case in which TCI state/ TRP association for the PDCCH is both beams while the TCI state/TRP association for the PDSCH is the first beam, then reception of PDSCH is only done for the first PDSCH transmission occasions (along with PDCCH reception), while PDCCH reception is prioritized at the time of the second PDSCH transmission occasions. For the very first single-DCI based multi TRP transmission, before BAT when only one unified TCI state is indicated and can be applied, the default beams may be determined based on both TCI states of the lowest MAC CE codepoint among ones with two TCI states.

For semi-persistent and aperiodic SRS resources as target RS, an example of MAC CE based association approach is by adding a new field or reusing the existing spatial relation info field for association indication inside the same MAC CE command used to activate/deactivate/update the semi- persistent/aperiodic SRS resources. Similarly, new fields may be introduced inside DCI to indicate association of triggered SRS resources with indicated unified TCI states in vector bit or bitmap format. For semi-persistent CSI-RS resources as target RS, the MAC CE based approach may add a new field or reusing the existing TCI state field for association indication inside the same MAC CE command used to activate/deactivate/update semi-persistent CSI-RS resources. Additionally, new fields may be introduced inside DCI to indicate association of CSI-RS resources with indi- cated unified TCI states in vector bit or bitmap format.

Beam Application Time (BAT) Definition

A beam application time in a multi-TRP transmission may be defined in a collective manner in which all the TRPs reference one specific ACK transmission as the counting reference symbol or in a per-TRP manner in which each TRP references its corresponding TRP ACK transmission as the counting reference symbol of that TRP. To illustrate, for multi-TRP transmission in single-DCI scheme, the corre- sponding ACK transmission of that single DCI may be considered as the time reference to define application time of multi-TRP TCI states update as at least Y symbols after the last symbol of that ACK transmission. For multi-TRP trans- mission in multi-DCI scheme, one potential solution may be to define new beam application time per TRP where the indicated TCI state of each TRP is applied at least Y symbols after the last symbol of its own corresponding ACK trans- mission.

In some embodiments, as a unified design scheme for both single-DCI and multi-DCI schemes in multi-TRP transmis- sion, the UE may determine one of the TRPs and/or its corresponding unified TCI state as a reference TRP and/or a reference unified TCI state in multi-DCI scheme, where the corresponding ACK of that reference TRP and/or unified TCI state may be used to define new beams application time. That reference may be semi-statistically configured or dynamically indicated/updated to UE or some embodiments may use a specific rule to indicate the reference TRP and/or unified TCI state such as based on order of (e.g. smallest, largest, the first, a specific) CORESETPoolIndex, TCI state pool index, TCI state ID or even source resource ID of the indicated TCI state. In some embodiments, the beam appli- cation time may be defined as at least Y symbols after the last symbol of the latest ACK among all ACKs correspond- ing to multi DCIs. In all the above schemes, if the MAC CE only activates a single TCI codepoint, new beam application time may follow the Rel.16 application timeline of MAC CE activation.

Figure 10:
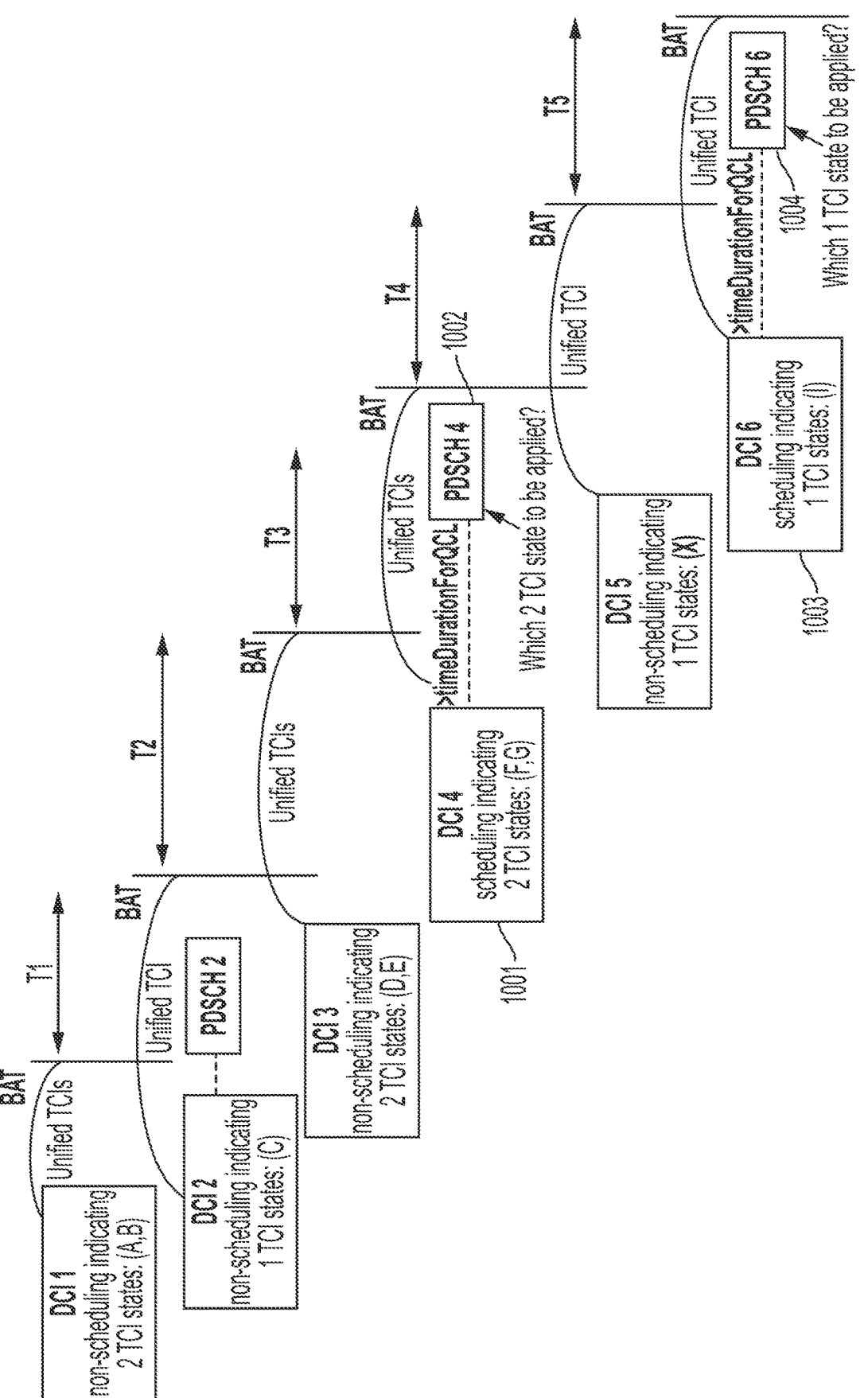
FIG. 10 illustrates an example of PDSCH reception behavior, according to an embodiment.

In some embodiments, when the scheduling offset between a scheduling DCI and the scheduled PDSCH is greater than timeDurationForQCL threshold, the unified TCI state(s) indicated by the scheduling DCI may be applied for the reception of the scheduled PDSCH even before the beam application time, for both single-TRP and multi-TRP trans- mission schemes. FIG. 10 illustrates an example of this behavior, wherein the beams to be used to receive PDSCH 4 (1002) are TCI states (F,G), which were indicated by the scheduling multi-TRP DCI 4 (1001), and the beam to be used to receive PDSCH 6 (1004) is TCI state (I) that was indicated by scheduling single TRP DCI 6 (1003). For any other target channels/RS s, the UE may apply those indi- cated unified TCI state(s) after beam application time, as discussed earlier.

Default Beam Considerations

An ambiguity regarding the default beam to use for transmission may arise when there is no TCI field present in the DCI of a multi-TRP transmission. In some embodiments, when there is no TCI field present in the DCI of a multi-TRP transmission, the default beam may be determined based on the TCI states of the lowest MAC CE codepoint among ones with two TCI states. Extending the unified TCI framework for multi-TRP transmission, for a single-DCI scheme or for a multi-DCI scheme with the same single codepoint indica- tion across all TRPs (i.e. a single codepoint maps to all unified TCI states), the UE may determine the default unified TCI states as the TCI states of the lowest MAC CE codepoint among ones mapped to multiple unified TCI states (e.g., multiple joint DL/UL TCI states, multiple pairs of DL and UL TCI states or a combination of them). In some embodiments, for multi-DCI scheme, if any other corre- sponding DCI has a TCI field present, the default beam may be determined by the indicated unified TCI states by that DCI. In a multi-DCI scheme with separate per TRP code- point indication design, the default beam may be determined based on TCI state of the lowest CORESET index among ones configured with unified TCI state.

Another UE beam ambiguity that may arise is when the scheduling offset is smaller than timeDurationForQCL threshold. In Rel. 17, as explained earlier, the UE behavior for single-TRP transmission is that the UE follows the indicated TCI (for both non-UE dedicated and UE dedicated PDSCH) for intra-cell transmission, and the UE follows the Rel. 16 behavior (for both non-UE dedicated and UE dedi- cated PDSCH) for intra-cell transmission.

The Rel. 16 UE behavior for determination of the default beam when the scheduling offset is smaller than timeDura- tionForQCL threshold is based on:

TCI state of the lowest CORESET index for single-TRP transmission,

TCI states of the lowest MAC CE codepoint among ones mapped to multiple TCI states for single-DCI scheme in multi-TRP transmission, TCI states of the lowest CORESET indexes associated with the values of coresetPoolIndex for multi-DCI scheme in multi-TRP transmission.

In some embodiments, the maximum rank that the UE supports and reports to the gNB (i.e. maxNumberMIMO-LayersPDSCH) is shared for both multi-TRP transmissions and single-TRP transmissions. When the scheduling offset is smaller than timeDurationForQCL threshold in multi-TRP transmission scheme with two TRPs, the UE may apply both beams for PDSCH reception from both TRPs, following the Rel. 16 default beam rule. Then, when a single-TRP transmission is scheduled, some layers of that PDSCH may be received with one of the default beams (i.e. the beam corresponding to the transmitting TRP) and the rest of the layers may be received with the other beam (i.e. the beam corresponding to the non-transmitting TRP), resulting in a significant performance loss.

In another words, when the scheduling offset is smaller than timeDurationForQCL threshold in multi-TRP transmission scheme, the UE may only support half of the reported maximum rank if only one TRP PDSCH is scheduled. To address this issue, in some embodiments, the maximum rank of transmission per single-TRP transmission may be restricted to half of the value reported in maxNumberMIMO-LayersPDSCH for multi-TRP transmission when the scheduling offset is smaller than timeDurationForQCL threshold.

For single-DCI multi-TRP transmission, the default beam rule may be adopted given that the gNB would not schedule a single-DCI single-TRP transmission when the scheduling offset is smaller than timeDurationForQCL threshold. For multi-DCI multi-TRP transmission, however, it may be necessary to define the aforementioned rank restriction to avoid application of the wrong beam for PDSCH reception. To address this issue, the maximum rank of transmission per single-TRP transmission may be restricted to the half of the maximum rank that UE supports for multi TRP transmission (as reported in maxNumberMIMO-LayersPDSCH) when the scheduling offset may be smaller than timeDuration-ForQCL threshold. More specifically, this can be realized as below:

| Definitions for parameters | Per | M | FDD-TDD DIFF | FR1-FR2 DIFF |
|---|---|---|---|---|
| maxNumberMIMO-LayersPDSCH-ForMulti-DCI-mTRP-default-r17 If this field is included, for DL reception of multi-DCI based multi-TRP scheme when the gap between DCI and PDSCH is smaller than timeDurationForQCL, the maximum number of spatial multiplexing layer(s) supported by the UE for each PDSCH is half of the value reported in maxNumberMIMO-LayersPDSCH. If the UE signals maxMIMO-LayersForMulti-DCI-mTRP-r16, then the maximum number of spatial multiplexing layer(s) supported by the UE for each PDSCH is half of the value reported in maxMIMO-LayersForMulti-DCI-mTRP-r16. | Band | No | N/A | FR2 only |

The above approach does not allow explicit indication of maximum number layers since it relates to the existing parameters. Hence, in some embodiments, the maximum number of MIMO layers for PDSCH in this situation as UE capability may be as below:

| Definitions for parameters | Per | M | FDD-TDD DIFF | FR1-FR2 DIFF |
|---|---|---|---|---|
| maxNumberMIMO-LayersPDSCH-ForMulti-DCI-mTRP-default-r17 If this field is included, for DL reception of multi-DCI based multi-TRP scheme when the gap between DCI and PDSCH is smaller than timeDurationForQCL, the maximum number of spatial multiplexing layer(s) supported by the UE for each PDSCH is determined by a signalled value by the UE in this field. The candidate value is {1,2,4}. | Band | No | N/A | FR2 only |

The above capabilities may be extended as below to cover the single-DCI M-TRP unified TCI case mentioned earlier as well:

| Definitions for parameters | Per | M | FDD-TDD DIFF | FR1-FR2 DIFF |
|---|---|---|---|---|
| maxNumberMIMO-LayersPDSCH-For-unified-S-DCI-mTRP-default-r17 If this field is included, for DL reception when single-DCI based multi-TRP unified TCI is configured and the gap between DCI and PDSCH is smaller than timeDurationForQCL, the maximum number of spatial multiplexing layer(s) supported by the UE for each PDSCH scheduled | Band | No | N/A | FR2 only |

-continued

| Definitions for parameters | Per | M | FDD-TDD DIFF | FR1-FR2 DIFF |
|---|---|---|---|---|
| with one TCI state is half of the value reported in maxNumberMIMO-LayersPDSCH. | | | | |

| Definitions for parameters | Per | M | FDD-TDD DIFF | FR1-FR2 DIFF |
|---|---|---|---|---|
| maxNumberMIMO-LayersPDSCH-For-unified-S-DCI-mTRP-default-r17<br>If this field is included, for DL reception when single-DCI based multi-TRP unified TCI is configured and the gap between DCI and PDSCH is smaller than timeDurationForQCL, the maximum number of spatial multiplexing layer(s) supported by the UE for each PDSCH scheduled with one TCI state is determined by a signalled value by the UE in this field. The candidate value is {1,2,4}. | Band | No | N/A | FR2 only |

Extending the unified TCI framework for multi-TRP transmission, some embodiments may first address the intra-cell only transmission scenario where all indicated TCI states may be associated with serving cell PCI. In such scenarios, if the scheduling offset is greater than timeDuration-ForQCL threshold, the UE may apply the indicated unified TCI state to PDCCH and the respective PDSCH reception. If the scheduling offset is smaller than the time-DurationForQCL threshold in an intra-cell only transmission scenario, for single-DCI multi-TRP transmission scheme, the UE may use indicated TCI(s) for any PDSCH reception (i.e. both UE-dedicated and non-UE-dedicated PDSCH), and no default beam consideration may be required. It is, however, noted that this is with assumption that gNB would not schedule dynamic switching between single-TRP and multi-TRP transmissions in a single-DCI scheme when the scheduling offset is smaller than the timeDurationForQCL threshold. In other words, when the scheduling offset is smaller than timeDurationForQCL threshold, no single-TCI codepoint is indicated by DCI in per-TRP TCI field scheme or no codepoint mapped to a single TCI state would be activated by MAC CE or indicated by DCI in one TCI field scheme. In some embodiments, if the scheduling offset is smaller than the timeDurationForQCL threshold in an intra-cell only transmission scenario, for single-DCI multi-TRP transmission scheme, the UE may follow the Rel. 16 behav-ior for both non-UE dedicated and UE dedicated PDSCH and apply the TCI state of the lowest MAC CE codepoint among ones mapped to multiple unified TCI states. This solution is also with assumption that the gNB would not schedule a single DCI single TRP transmission (i.e., single TCI codepoint is not indicated by DCI in per TRP TCI field scheme) or a codepoint mapped to a single TCI state either does not coexist or is not indicated by DCI (in one TCI field scheme) when the scheduling offset is smaller than timeDu-rationForQCL threshold.

Another alternative when the scheduling offset is smaller than timeDurationForQCL threshold may be to follow default TRP association. For example, there may be a pre-defined rule, RRC indication or MAC-CE indication to provide default TRP association. Such a rule or indication determines if one or multiple TCI's are applied for the scheduled PDSCH, and also determines which TRP (or TCI associated with such a TRP) is applied in the case when one TCI is applied. Another example of default association is to apply previously indicated one by a DCI where gap between such DCI and the PDSCH of interest is greater than time-DurationForQCL. If some embodiments allow gNB the flexibility of dynamic switching between single and multiple TRP transmissions when the scheduling offset is smaller than timeDurationForQCL threshold, applicable to both proposed solutions above, some embodiments may need to restrict the maximum rank of transmission per single-TRP transmission to avoid application of the wrong beam for reception of some layers of PDSCH. To illustrate, if the maximum rank that the UE supports for multi-TRP trans-mission is N, the maximum rank of any scheduled single-TRP transmission may be restricted to N/2 when the sched-uling offset is smaller than timeDurationForQCL threshold. For multi-DCI transmission scheme, similarly, with gNB flexibility of dynamic switching between single-TRP and multi-TRP transmissions when the scheduling offset is smaller than timeDurationForQCL threshold, the maximum rank of transmission per single TRP transmission may be restricted to the half of the maximum rank that UE supports for multi-TRP transmission (as reported in maxNumber-MIMO-LayersPDSCH).

Since the application of the indicated unified TCI state to PDCCH and the respective PDSCH reception may be deter-mined per CORESET RRC configuration, the definition of inter-cell transmission in multi-TRP operation may be fur-ther clarified in some embodiments to further address the UE ambiguity on determination of TCI state when the schedul-ing offset is smaller than timeDurationForQCL threshold.

For multi-DCI multi-TRP, the inter-cell determination may be based on per CORESET pool index, following the same per CORESET pool index mechanism for default beam determination. To illustrate, it is possible that the indicated unified TCI state for coresetPoolIndex 0 is intra-cell (i.e. indicated TCI state is associated with serving cell PCI), and indicated unified TCI state for coresetPoolIndex 1 is inter-cell (i.e. indicated TCI is associated with PCI dif-ferent from serving cell PCI). For intra-cell transmission, the UE may apply indicated TCI state in CORESET with coresetPoolIndex 0. For inter-cell transmission, the UE may apply TCI state of the lowest CORESET ID in the latest slot in CORESET with coresetPoolIndex 1.

Another approach to define the inter-cell transmission in multi-DCI multi-TRP scenario may be to define inter-cell transmission as when at least one of TRPs is indicated with a TCI state associated with serving cell PCI (i.e. intra-cell), and the gNB would most likely transmit non-UE dedicated PDSCH only from that at least one specific intra-cell TRP. For the specific TRP or a certain CORESET pool index, which may be predetermined or semi-statically configured or dynamically (MAC CE/DCI) indicated to the UE, the UE may follow unified TCI regardless of inter-cell or intra-cell transmission as it is associated with UE dedicated PDSCH. In some embodiments, that specific TRP or a certain CORE-SET pool index may be indicated to the UE implicitly. To illustrate, configuration of all CORESETS in one coreset-PoolIndex to follow the indicated unified TCI state by the gNB is an implicit indication for the UE to follow the unified TCI.

Another approach for inter-cell determination in multi-DCI multi-TRP transmission may be to define inter-cell transmission as when all indicated TCI states are associated with PCIs different from the serving cell PCI (i.e. transmission from all TRPs may be inter-cell). With such definition, the UE may apply TCI state of the lowest MAC CE codepoint among ones mapped to multiple unified TCI states.

For single-DCI multi-TRP transmission or for the proposed multi-DCI scheme with the same single codepoint indication across all TRPs, some embodiments may define inter-cell transmission in multi-TRP operation as when at least one of multiple indicated states is associated with a PCI different from the serving cell PCI. In such case, it is possible that inter-cell transmission may be scheduled from this CORESET that may result in beam ambiguity similarly as in Rel. 17 especially when there may be other CORESETs that may be configured not to follow the indicated unified TCI state. To address this, some embodiments may consider that it is unlikely to have non-UE dedicated PDSCH for a multi-TRP transmission. Hence, only a specific TRP may transmit non-UE dedicated PDSCH, and that specific TRP may be explicitly (i.e. through RRC/MAC CE/DCI) or implicitly indicated to a UE. Thus, the determination of inter-cell transmission may be defined as only when this specific TRP has been indicated with TCI state associated with PCI different from serving cell PCI.

In some embodiments, inter-cell determination in single-DCI multi-TRP transmission may be considered to be when all indicated TCI states are associated with PCI different from serving cell PCI (i.e., transmission from all TRPs may be inter-cell), under the assumption that the gNB would implicitly use intra-cell TRP to transmit non-UE dedicated PDSCH when one of the indicated TCI states is associated with serving cell PCI (i.e., intra-cell). With such definition, the UE may apply TCI state of the lowest MAC CE codepoint among ones mapped to multiple unified TCI states. Furthermore, since the UE would not know if the scheduled PDSCH may be a single-TRP or multi-TRP before finishing decoding the DCI, some embodiments may define the default beam rule for all CORESETS in all cases as the UE would apply TCI state of the lowest MAC CE codepoint among ones mapped to multiple unified TCI states for both non-UE dedicated and UE dedicated PDSCH transmission.

It is noted all above proposed default beam considerations are also applicable to default beam determination for aperiodic CSI-RS resources.

Dynamic Switching Between Single-TRP and Multi-TRP Operations

Depending on target application scenario, the gNB may switch between single-TRP and multi-TRP transmissions, for example, to provide either high reliability/coverage (e.g. for cell edge or high mobility scenarios) or high throughput (e.g. for cell center or low mobility scenarios). In current specification, for a single-DCI multi-TRP transmission scheme, the indicated codepoints by MAC CE command may be either mapped to one TCI state or multiple TCI states to allow dynamic switching between single-TRP and multi-TRP transmissions. For one TCI field scheme as explained earlier, the dynamic switching between single-TRP and multi-TRP transmission may be implicitly feasible based on the number of associated unified TCI states to the indicated codepoint of the DCI. For per TRP TCI field scheme as explained earlier, the dynamic switching between single-TRP and multi-TRP transmission may be implicitly feasible based on TCI state/TRP association indication in DCI. In both schemes, the implicit dynamic switching indication may also be used as an implicit indication to determine reception beam for any respective PDSCH.

Figure 11:
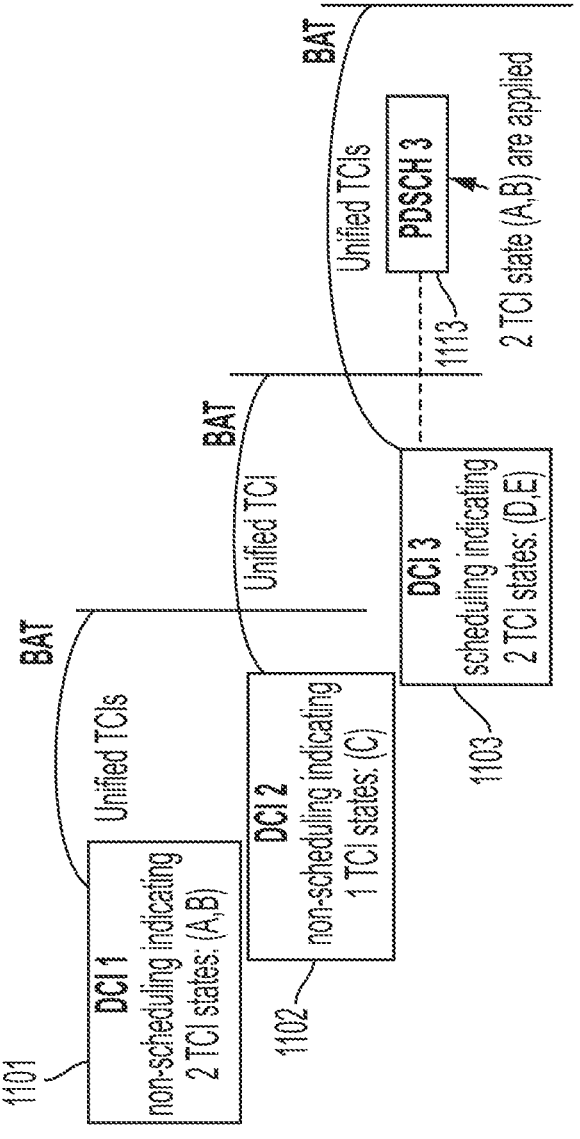
FIGS. 11, 12, 13, 14 and 15 illustrate examples of UE behavior in applying TCI states, according to embodiments.

Depending on UE capability, the UE may maintain active at the same time a set of single-TRP indicated unified TCI states and multi-TRP indicated unified TCI states as an active/current TCI state set. FIG. 11 illustrates an example of such UE behavior in which, at each time instance, the UE may keep multiple indicated unified TCI states (e.g., a set of single-TRP and multi-TRP unified TCI states) active. Both the two TCI states (A,B) indicated by the DCI 1 (1101) and the one TCI state (C) indicated by the DCI 2 (1102) may be maintained active at the same time at the UE as the active/current TCI state set, and the UE may determine implicitly the beam(s) to be used for PDSCH 3 (1113) reception based on the TCI codepoint of the respective scheduling DCI 3 (1103). That is, the number of TCI states mapped to the indicated TCI codepoint of scheduling DCI may be an implicit indication to the UE whether to use previously indicated and currently active two TCI states (A,B) or previously indicated and currently active one TCI state (C) for the respective PDSCH 3 reception during the beam application time of this DCI 3.

The above proposed solution may be generalized to address more complicated scenarios and the possible beam ambiguity scenarios by defining some default UE behavior rules accordingly. For a single-DCI multi-TRP transmission, given the UE maintains a current set of active TCI states that includes a configuration of multiple single-TRP states and a configuration of multi-TRP unified TCI states, one possible ambiguity may be how the UE would keep and update the current set of active unified TCI states (e.g. whether newly indicated multi-TRP unified TCI states can overwrite the corresponding previously indicated and active single-TRP unified TCI state and vice versa).

Figure 12:
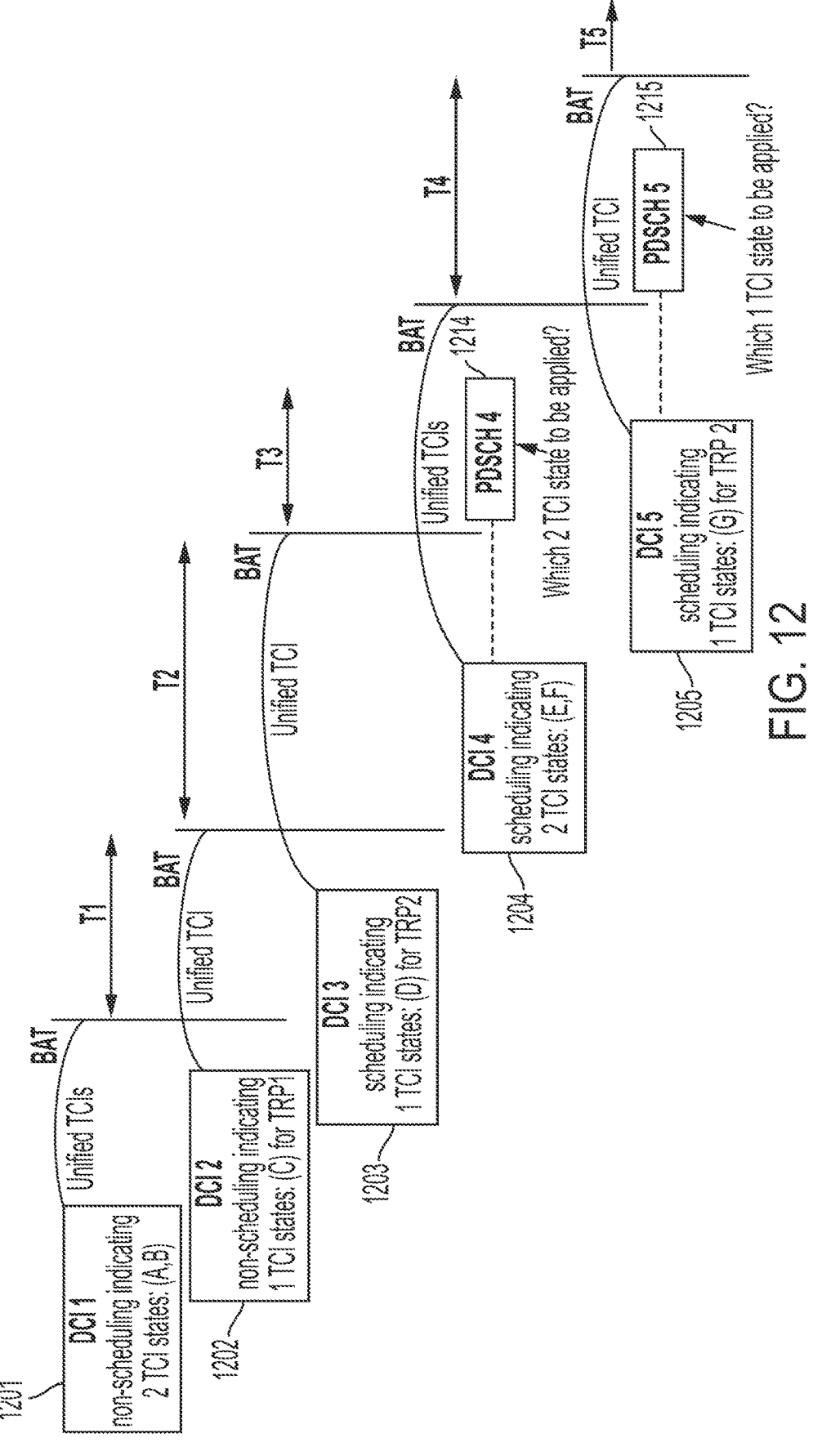

FIG. 12 illustrates another example of UE behavior in applying TCI states based on the active/current TCI state set. The DCI 4 (1204) schedules the PDSCH 4 (1214). Although the DCI 4 indicates multi-TRP TCI states (E,F), the indicated multi-TRP TCI states (E,F) may not be used for reception of the PDSCH 4 because the PDSCH 4 is scheduled for reception before the applicable BAT. Instead, the UE may apply a configuration of the active/current TCI state set corresponding to the type of the indicated TCI states. In the case of DCI 4, which indicates multi-TRP TCI states, the UE may apply a configuration of the active/current TCI state set corresponding to multi-TRP TCI states.

FIG. 12 also shows that the concept of associated TRP for every single TCI indication, e.g., DCI 2 (1202), DCI 3 (1203), DCI 5 (1205). Such TRP association can be established by following the TRP association for DCI reception.

As discussed earlier, when multi-TRP unified TCI states are indicated to UE, an association of those indicated unified TCI states with different TRPs may need to be indicated to the UE as well so that the UE can determine which one of the indicated unified TCI states to apply for transmissions of a specific TRP. With a TCI/TRP association assumption that in an indicated multi-TRP unified TCI state (TCI1, TCI2), TCI1 may be associated to TRP1 and TCI2 may be associated to TRP2 transmissions, at the time of PDSCH 3 and PDSCH 4 reception, there may be an ambiguity at the UE about the active single-TRP unified TCI state as well as multi-TRP unified TCI states (i.e., configurations of the active/current TCI state set). This issue may be addressed by various bookkeeping embodiments, or schemes, below:

Scheme I: In some embodiments, the UE may maintain and update the active/current set of unified TCI states for single-TRP and multi-TRP operations as separate configurations, and the active/current unified TCI states in each of these configurations (e.g., TRP1, TRP2 or multi-TRP) may be updated separately only with the DCI with same type of transmission scheme and corresponding TRP. For example, the already indicated and active/current single-TRP unified TCI state configuration for TRP1 may only be updated with a single-TRP DCI corresponding to TRP1 (i.e., the indicated codepoint is mapped to a single TCI state corresponding of the respective TRP). Similarly, the configuration for the already indicated and active/current multi-TRP unified TCI states may only be updated with a multi-TRP DCI (i.e., the indicated codepoint is mapped to multiple TCI states) indicating multi-TRP TCI states. Under Scheme I, the active/current unified TCI state (i.e. beam) bookkeeping for the example of FIG. 12 is as follows:

| | Active beam bookkeeping at UE | | |
|---|---|---|---|
| Time | Beams for multi-TRP | Beam for TRP1 | Beam for TRP2 |
| T1 | (A,B) | initial/earlier indicated (not shown in the figure) | initial/earlier indicated (not shown in the figure) |
| T2 | (A,B) | C | initial/earlier indicated (not shown in the figure) |
| T3 | (A,B) | C | D |
| T4 | (E,F) | C | D |
| T5 | (E,F) | C | G |

The beams to be used to receive PDSCH 4 (1214) are TCI states (A,B), which were indicated by the multi-TRP DCI 1 (1201), and the beam to be used to receive PDSCH 5 (1215) is TCI state D, which was indicated by single-TRP DCI 3 (1203).

Scheme II: In some embodiments, the UE may update the active/current TCI state set associated to each TRP with each new DCI indication regardless of whether the transmission scheme is single-TRP or multi-TRP. For example, the already indicated and active/current single-TRP unified TCI state a TRP may be updated either with a single-TRP DCI (i.e. with the single TCI state indicated by the codepoint) specifying the TRP or with a multi-TRP DCI (i.e. with one of TCI states indicated by the codepoint according to TRP association) specifying multi-TRPs including the TRP. Similarly, each one of already indicated and active/current multi-TRP unified TCI states may be updated with a multi-TRP DCI or a single-TRP DCI. Under Scheme II, the active/current unified TCI state bookkeeping for the example of FIG. 12 is as follows:

| | Active beam bookkeeping at UE | | |
|---|---|---|---|
| Time | Beams for multi TRP | Beam for TRP1 | Beam for TRP2 |
| T1 | (A,B) | A | B |
| T2 | (C,B) | C | B |
| T3 | (C,D) | C | D |
| T4 | (E,F) | E | F |
| T5 | (E,G) | E | G |

The beams to be used to receive PDSCH 4 (1214) are TCI states (C,D), which were indicated by the single-TRP DCI 2 (1202) and DCI 3 (1203), and the beam to be used to receive PDSCH 5 (1215) is TCI state F, which was indicated by the multi-TRP DCI 4 (1204).

The bookkeeping for Scheme II may be simplified as follows:

| Active beam bookkeeping at UE | |
|---|---|
| Time | Beams for TRP1 and TRP2 |
| T1 | A and B |
| T2 | C and B |
| T3 | C and D |
| T4 | E and F |
| T5 | E and G |

That is, the active/current TCI state set may maintain a configuration of TCI state for each single TRP and may not need to maintain a separate configuration of TCI states for multi-TRPs.

Scheme III: In some embodiments, the UE may update the active/current single-TRP TCI state with each new DCI indication regardless of single-TRP or multi-TRP transmission scheme, while active/current multi-TRP TCI states may only be updated with a new multi-TRP DCI indication. Under Scheme III, the active/current unified TCI state bookkeeping for the example of FIG. 12 is as follows:

| | Active beam bookkeeping at UE | | |
|---|---|---|---|
| Time | Beams for multi TRP | Beam for TRP1 | Beam for TRP2 |
| T1 | (A,B) | A | B |
| T2 | (A,B) | C | B |
| T3 | (A,B) | C | D |
| T4 | (E,F) | E | F |
| T5 | (E,F) | E | G |

The beams to be used to receive PDSCH 4 are TCI states (A,B), which were indicated by the multi-TRP DCI 1 (1201), and the beam to be used to receive PDSCH 5 (1215) is TCI state F, which was indicated by the multi-TRP DCI 4 (1204).

Scheme IV: In some embodiments, the UE may update the active/current single-TRP TCI state only with a new single-TRP DCI indication, while active/current multi-TRP TCI states may be updated with each new DCI indication regardless of single-TRP or multi-TRP transmission. Under Scheme IV, the active/current unified TCI state bookkeeping for the example of FIG. 12 is as follows:

| Time | Beams for multi TRP | Beam for TRP1 | Beam for TRP2 |
|------|---------------------|---------------|---------------|
| | | Active beam bookkeeping at UE | |
| T1 | (A,B) | initial/earlier indicated (not shown in the figure) | initial/earlier indicated (not shown in the figure) |
| T2 | (C,B) | C | initial/earlier indicated (not shown in the figure) |
| T3 | (C,D) | C | D |
| T4 | (E,F) | C | D |
| T5 | (E,G) | C | G |

The beams to be used to receive PDSCH 4 (1214) are TCI states (C,D), which were indicated by the single-TRP DCI 2 (1202) and DCI 3 (1203), and the beam to be used to receive PDSCH 5 (1215) is TCI state D, which was indicated by the single-TRP DCI 3 (1203).

In the above example schemes, some embodiments only discussed unified TCI states determination for PDSCH transmission. However, the discussions may also be applicable to PDCCH/PUCCH/PUSCH transmission, as the fundamentals may be the same, and some embodiments may prefer unified solution for all PDCCH/PDSCH/PUCCH/ PUCSH transmission channels. It is, however, noted that for PDCCH and PDSCH, the discussed DCI is DCI format 1_1 and 1_2, while for PUCCH and PUSCH, the aforementioned DCI would be DCI format 0_1 or 0_2.

For cases in which UE is only able to keep one active single TRP unified TCI state in addition to active multi TRP unified TCI states, some embodiments may assume the indicated single-TRP unified TCI state may be applied to any single-TRP transmission, for example, from TRP1 or TRP2. However, that may not be a practical assumption. Some embodiments may limit single-TRP transmission only from a specific TRP (i.e., single TRP transmission for the other TRPs would not happen). Some embodiments may limit beam determination for the other TRPs to follow Rel. 16 rule in case a single-TRP transmission from those TRPs is scheduled. In such scenarios, there may be ambiguity at the UE on updating the set of active unified TCI states. An example of such scenario is shown in FIG. 13.

Figure 13:
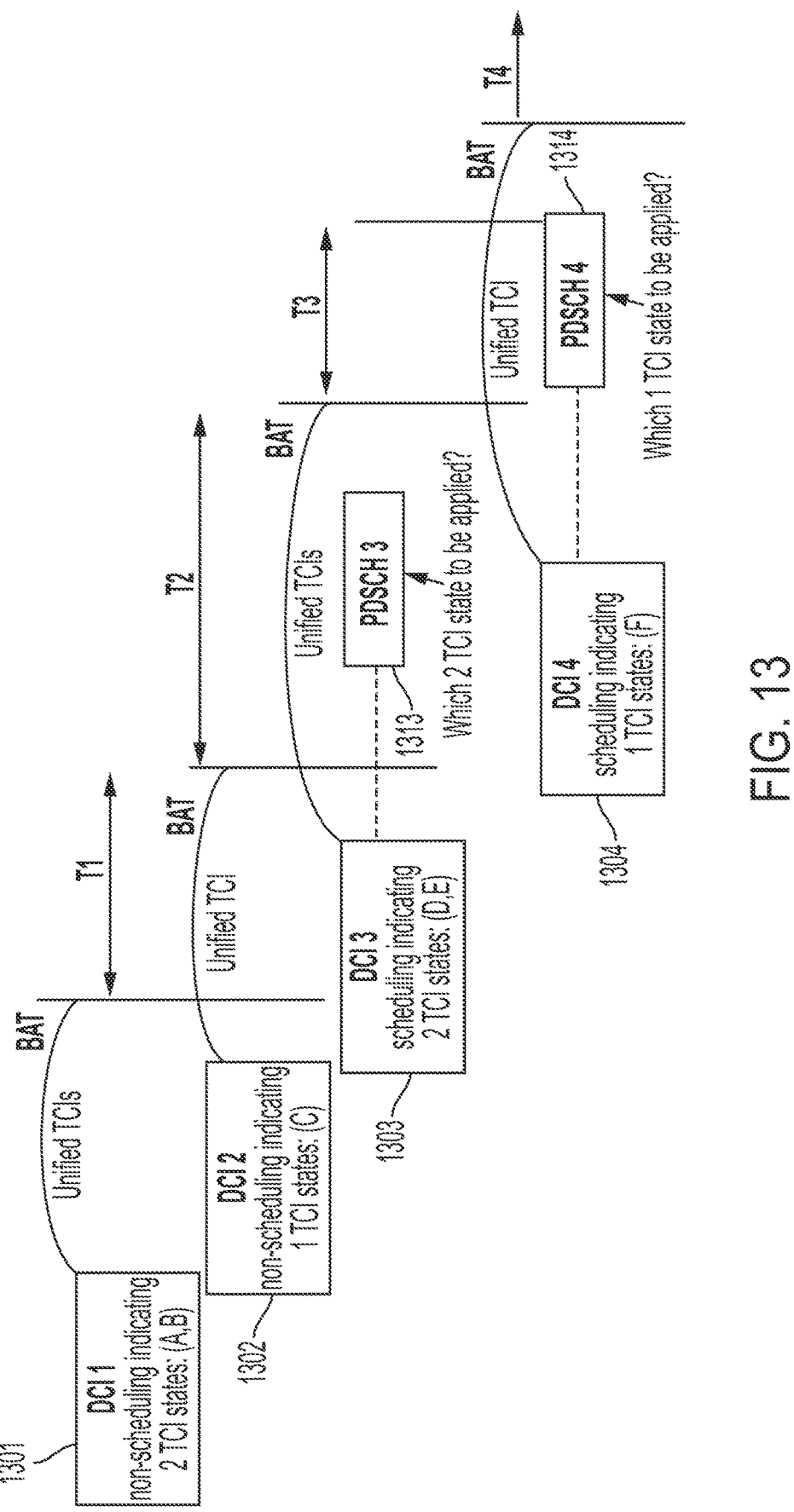

FIG. 13 illustrates another example of UE behavior in applying TCI states based on the active/current TCI state set. With the TCI/TRP association assumption that, in an indicated multi-TRP unified TCI state (TCI1, TCI2), TCI1 is associated to TRP1 and TCI2 is associated to TRP2 transmissions, and an indicated single-TRP unified TCI state is only applied to single-TRP transmission from TRP1, at the time of PDSCH 3 (1313) and PDSCH 4 (1314) reception, there may be an ambiguity at the UE about the active/current single-TRP unified TCI state as well as multi-TRP unified TCI states. This issue may be addressed by the various embodiments/schemes below.

Scheme V: In some embodiments, the UE may separately update the active/current unified TCI states of single-TRP and multi-TRP operations such that the active/ current unified TCI states for each of these transmissions may be updated individually only with the DCI specifying the unified TCI states with same type of transmission scheme. Referencing the example of FIG. 13 under Scheme V, the beams to be used to receive PDSCH 3 (1303) re TCI states (A,B), which were indicated by the multi-TRP DCI 1 (1301), and the beam to be used to receive PDSCH 4 (1314) is TCI state C, which was indicated by single-TRP DCI 2 (1302). In this case, bookkeeping at the UE for the example of FIG. 13 may be as follows:

| Time | Beams for multi TRP | Beam for single TRP |
|------|---------------------|---------------------|
| T1 | (A,B) | initial/earlier indicated (not shown in the figure) |
| T2 | (A,B) | C |
| T3 | (A,B) | D |
| T4 | (E,F) | D |
| T5 | (E,F) | G |

Scheme VI: In some embodiments, the UE may update the active/current TCI states associated to each TRP with each new DCI indication regardless of single-TRP or multi-TRP transmission scheme. Referencing the example of FIG. 13 under Scheme VI, the beams to be used to receive PDSCH 3 (1313) re TCI states (C,B), which were indicated by the multi-TRP DCI 1 (1301) and single-TRP DCI 2 (1302), and the beam to be used to receive PDSCH 4 (1314) is TCI state D, which was indicated by the multi-TRP DCI 3 (1303).

Scheme VII: In some embodiments, the UE may update the active/current single-TRP TCI state with each new DCI indication regardless of single-TRP or multi-TRP transmission scheme, while the active/current multi-TRP TCI states may be only updated with a new multi-TRP DCI indication. Referencing the example of FIG. 13 under Scheme VII, the beams to be used to receive PDSCH 3 (1313) are TCI states (A,B), which were indicated by the multi-TRP DCI 1 (1301), and the beam to be used to receive PDSCH 4 (1314) is TCI state D, which was indicated by the multi-TRP DCI 3 (1303).

Scheme VIII: In some embodiments, the UE may update the active/current single-TRP TCI state only with a new single-TRP DCI indication, while the active/current multi-TRP TCI states may be updated with each new DCI indication regardless of single-TRP or multi-TRP transmission scheme. Referencing the example of FIG. 13 under Scheme VIII, the beams to be used to receive PDSCH 3 (1313) are TCI states (C,B), which were indicated by the multi-TRP DCI 1 (1301) and single-TRP DCI 2 (1302), and the beam to be used to receive PDSCH 4 (1314) is TCI state C, which was indicated by the single-TRP DCI 2 (1302). All the unified TCI states determination discussions above may also be applicable to PDCCH/PUCCH/PUSCH transmissions.

In some embodiments, there may be flexibility of coexistence of active indicated single-TRP unified TCI states and multi-TRP unified TCI states. This means, at each time instance, the UE may only have the latest indicated unified TCI state active, which may be either a single-TRP indicated TCI state or multi-TRP indicated unified TCI states. Given a multi-TRP operation with M unified TCI states that have been already applied at the UE, when a new DCI schedules a single-TRP transmission indicating one unified TCI state with a scheduling offset greater than timeDurationForQCL threshold, there may be beam ambiguity at the UE during new beam application time. Hence, the UE's behavior for identifying a beam in such scenarios may need to be determined. One solution may be to determine the beam according to the association of already indicated unified TCI states and TRPs. To illustrate, among all the multi-TRP indicated and already active unified TCI sates, the reception beam for the single-TRP transmission may be determined as the associated unified TCI state to the TRP that has transmitted the new DCI. Another solution may be to pre-determine one of the TRPs and/or its corresponding unified TCI state as a reference TRP and/or reference unified TCI state to be used to identify the default beam. That reference TRP and/or unified TCI state may be semi-statistically configured or dynamically indicated/updated to UE or determined based on a specific rule, such as a specific order (e.g. smallest/largest/first/last) of CORESETPoolIndex, TCI state pool index, TCI state ID or even source resource ID of the indicated TCI states.

Furthermore, given a single-TRP operation with one unified TCI state that has been already applied at the UE, when a new DCI schedules a multi-TRP transmission indicating multiple unified TCI states with a scheduling offset greater than timeDurationForQCL threshold, there may be beam ambiguity at the UE during new beam application time, and UE's behavior for identifying a beam in such scenarios may need to be determined. An example of such scenario is shown in FIG. 14.

Figure 14:
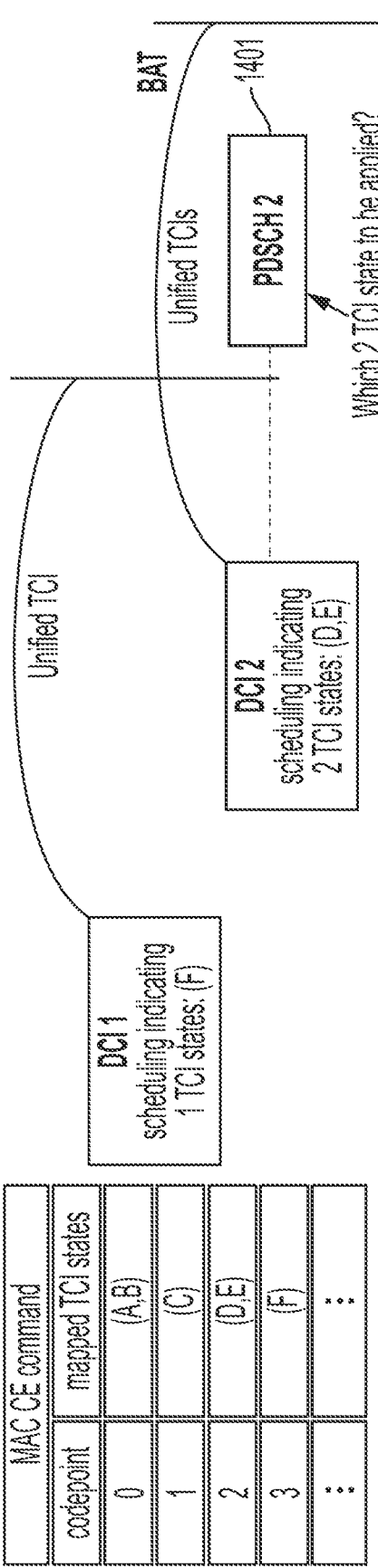

FIG. 14 illustrates another example of UE behavior in applying TCI states based on the active/current TCI state set. In some embodiments, the UE determines the beam(s) based on the lowest codepoint ID among activated multi-TRP codepoints in MAC CE command. In such scenario, regardless of the already active single-TCI state, the UE may apply the beam(s) associated to the lowest multi-TRP codepoint ID in MAC CE command. For example, the beams for PDSCH 2 (1401) reception may be TCI states (A,B), which corresponds to the first multi-TRP codepoint in MAC CE command.

Another solution may be for the UE to apply the already active single-TRP unified TCI state for the associated TRP transmission, and, for transmission by the other TRP, to determine the beam based on one of unified TCI states (e.g., chosen according to TCI/TRP association) mapped to the lowest codepoint ID among activated multi-TRP codepoints in MAC CE command. Referencing FIG. 14 under this solution, the beams for PDSCH 2 reception may be TCI state (F) for TRP1 and TCI state (B) for TRP2, where TCI state (B) is the corresponding TCI state of TRP2 in the first multi-TRP codepoint in MAC CE command.

Another solution may be for the UE to apply the already active single-TRP unified TCI state for the associated TRP transmission, and, for transmission by the other TRP, to determine the beam based on unified TCI state of the lowest codepoint ID among activated single-TRP codepoints in MAC CE command. For example, the beams for PDSCH 2 (1401) reception may be TCI state (F) for TRP1 and TCI state (C) for TRP2, where TCI state (C) is the first single-TRP codepoint in MAC CE command.

Another solution may be a modification of the beam application time definition for the scheduled PDSCH reception when the scheduling offset is greater than timeDurationForQCL threshold, as explained earlier. For example, when a new DCI schedules a single/multiple-TRP PDSCH reception with indication of one/multiple unified TCI state(s) with the scheduling offset greater than timeDurationForQCL threshold, the UE may apply those indicated unified TCI state(s) for the reception of that scheduled PDSCH. Under this modified beam application definition, there would not be beam ambiguity at the UE for dynamic switching between single-TRP and multi-TRP operations in the single-DCI scheme when the scheduling offset is greater than timeDurationForQCL threshold. The indicated unified TCI state(s) for each of these scheduled transmissions may be updated individually based on the corresponding scheduling DCI.

Figure 15:
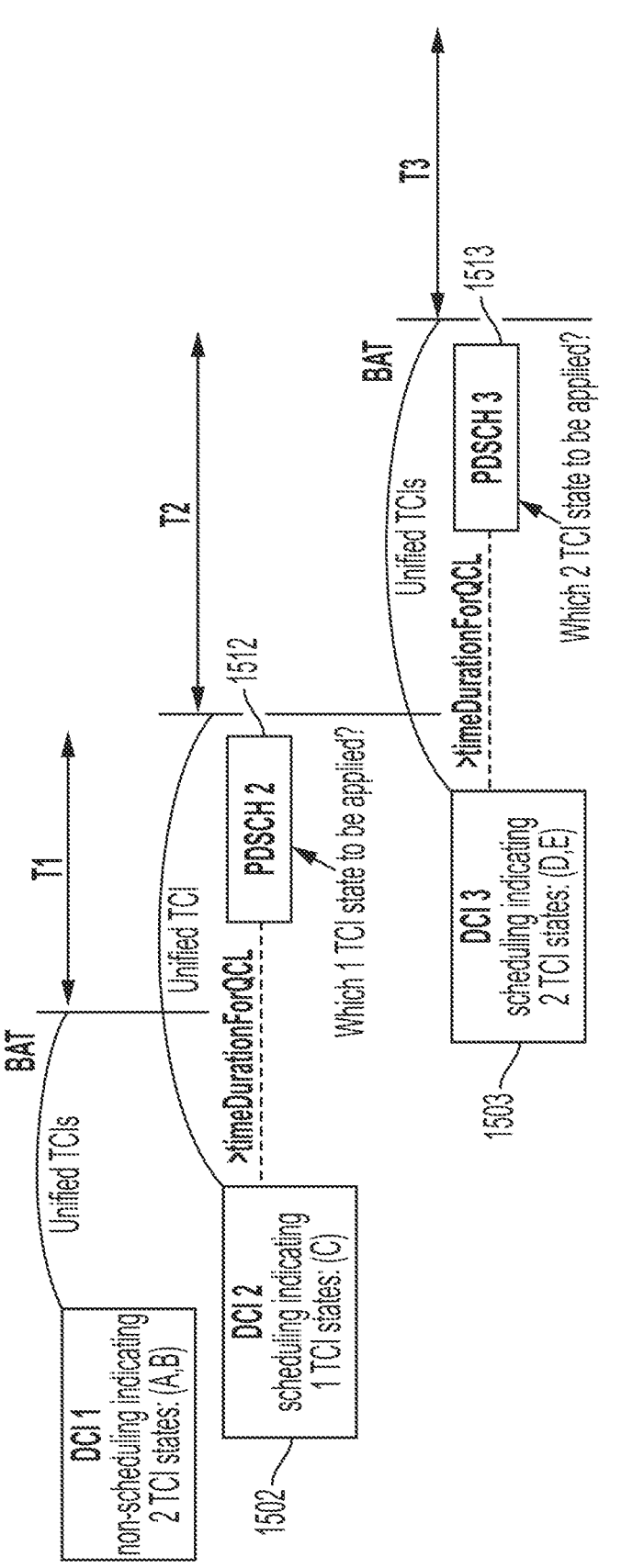

FIG. 15 illustrates an example of UE behavior in applying TCI states according to the solution of modified beam application time definition. The beam to be used to receive PDSCH 2 (1512) is TCI state (C), which was indicated by the scheduling single-TRP DCI 2 (1502), and the beams to be used to receive PDSCH 3 (1513) are TCI states (D,E), which were indicated by scheduling multi TRP DCI 3 (1503).

In some embodiments, the above-mentioned schemes are applicable for single-DCI multi-TRP transmissions where the indicated codepoints by MAC CE command may be mapped to a mixture of one TCI state or multiple TCI states (i.e., mixed indication of one TCI state and multiple TCI states may be allowed) to facilitate dynamic switching between single-TRP and multi-TRP transmissions. In some embodiments, such mixed indication of one TCI state and multiple TCI states in MAC CE command may be disallowed to prevent such beam ambiguity at the UE. For non-scheduling DCI, such scheme may be feasible for eliminating beam ambiguity at the UE. For scheduling DCI, however, such restriction would also prevent dynamic switching of single-TRP and multi-TRP transmissions. To address the dynamic switching issue while restricting mixed indication of one TCI state and multiple TCI states in MAC CE for a scheduling DCI, some embodiments may only allow indication of one TCI state in scheduling DCI as an indication to schedule single-TRP transmission, but in terms of beam/unified TCI state update, this indicated one TCI state may be ignored and not applied to the target channels.

In some embodiments, a new RRC configuration or MAC CE indication may be introduced for the default beams to address such scenario. In some embodiments, the UE may consider such scenario an error case.

In some embodiments, the above-discussed solutions for resolving beam ambiguity may be also applicable to multi-DCI multi-TRP transmission with the proposed unified design scheme as explained earlier, where the indicated codepoint in each DCI represents all unified TCI states of all TRPs.

Unified TCI State for CG/SPS-Based Transmission

There are two types of scheduling configuration schemes supported in 5G NR systems. A first type is dynamic grant (DG) scheduling, which enables new scheduling decision sent on PDCCH in each subframe and provides full flexibility of the resources allocation and the payload size. A second type is configured grant (CG) and semi-persistent scheduling (SPS)—based allocation, which has been adopted in NR for UL and DL transmissions respectively to support Ultra-Reliable and Low Latency Communication (URLLC) for industrial communications with regularly occurring transmission of relatively small payloads.

The CG/SPS—based scheduling mechanism facilitates low-latency access by avoiding control signaling overhead of scheduling requests and scheduling grants. For example, the scheduling mechanism may semi-statically allocate some resources and transport formats to a UE over a pre-defined time interval that includes a certain periodicity and number of occasions. The activation/deactivation of this type of scheduling is generally through PDCCH with a semi-persistent cell radio network temporary identifier (C-RNTI). In the Rel. 17 unified TCI framework, the indicated unified TCI state by DCI for a single-TRP transmission may be applied to any UE-dedicated PDCCH/PDSCH reception including both DG/SPS-based transmission as well as PUCCH/PUSCH transmission including both DG/CG-based transmission.

In some embodiments of the presently disclosed unified TCI framework for multi-TRP operation, the indicated multi-TRP unified TCI states may also be applied to both DG and SPS/CG-based transmissions. In the current specification, SPS/CG-based transmission is configured only for single-TRP transmission, which means there may be ambiguity at the UE regarding the TCI state for a SPS/CG-based transmission occasion when the UE has applied indicated unified TCI states of multi-TRP transmission. To address this issue, one solution may be to assume the coexistence of a single-TRP indicated unified TCI state and multi-TRP indicated unified TCI states (at the same time) for a UE (as explained earlier) and require the SPS PDSCH and CG PUSCH transmissions to always follow the latest indicated and already active single-TRP unified TCI state.

As another solution, the UE may use the TCI state/TRP association, as discussed earlier, to determine the associated indicated unified TCI state of the corresponding TRP and apply that TCI state for the single-TRP SPS/CG-based transmission. As another solution, the UE may use a predetermined rule based on the order of TCI state ID or order of TCI states in codepoint mapping in MAC CE (e.g., the smallest/largest/specific ID or TCI state) to determine and apply one of the indicated multi-TRP unified TCI states to single-TRP SPS-based transmission. When a dynamic scheduling command is detected, the UE may prioritize dynamic scheduling over the semi-persistent scheduling in that particular subframe.

BFR Mechanism with Unified TCI State

In some embodiments, the beam failure recovery (BFR) mechanism for unified TCI multi TRP transmission may be based on TRP-specific primary cell (PCell)/secondary cell (SCell) procedure for respective TRPs. Such scheme may be applicable to scenarios with multiple unified TCI states indication where at most one unified TCI state may be indicated per TRP, as well as, scenarios with one common unified TCI states indication shared among all TRPs. In some embodiments of such scheme, the gNB sends to the UE a BFR response that may contain a new unified TCI state or beam indication (per TRP). After receiving the BFR response, the UE may apply the new unified TCI state to all target channels and RSs that share the indicated unified TCI state, such as PDCCH in all CORESET, PDSCH, aperiodic CSI-RS, PUCCH, PUSCH and SRS. The new unified TCI state may be applied X symbols after reception of the BFR response at the UE. The value of X may be determined based on the smallest of the SCS configuration per TRP, which would allow new beam update in per TRP manner.

In some embodiments, the BFR mechanism for unified TCI multi-TRP transmission may be a simultaneous PCell/SCell procedure for all TRPs. For example, multiple beam failure detection RS sets may be RRC configured such that each set is associated with one TRP. This may be achieved through per TRP resource grouping and/or sub-pool design context, such as explained earlier. In some embodiments, beam failure detection RS sets/TRP association may be indicated using explicit semi-static or dynamic configurations or implicit predetermined rules (e.g. according to the order of RS set ID or coresetPoolIndex). For implicit beam failure detection RS determination, the source RS s of the indicated TCI states may represent the beam failure detection RS. For new beam identification, multiple RS sets may similarly be RRC configured such that each RS set may be associated with one TRP. This scheme may be a more efficient scheme for the scenario with one common unified TCI states indication that may be shared among all TRPs due to less signaling and latency. Under this scheme, the UE may apply the new TCI state to all target channels and RSs that share the indicated unified TCI states X symbols after the UE receives the BFR response. The value of X may be determined based on the smallest of the SCS configuration among all TRPs. This scheme may allow new TCI state(s) to be updated simultaneously across all TRPs. The BFR response from the gNB may contain one common or multiple new beam indication(s) in simultaneous manner corresponding to all TRPs.

In some embodiments, the BFR response transmission may be per TRP (i.e. with one unified new beam indication), in which case the new unified TCI state(s) may be updated X symbols (e.g., determined based on the smallest of the SCS configuration) after reception of the BFR response from a predetermined or semi-statistically configured or dynamically indicated one of the new beams/TRPs as the reference one. In some embodiments, a specific rule may be used to indicate the reference TRP/new beam (e.g. order of CORESETPoolIndex, TCI state pool index, TCI state ID or even source resource ID of the indicated TCI state, . . . ). In some embodiments, the UE may update the new unified TCI state(s) X symbols after reception of the latest BFR response.

Figure 16:
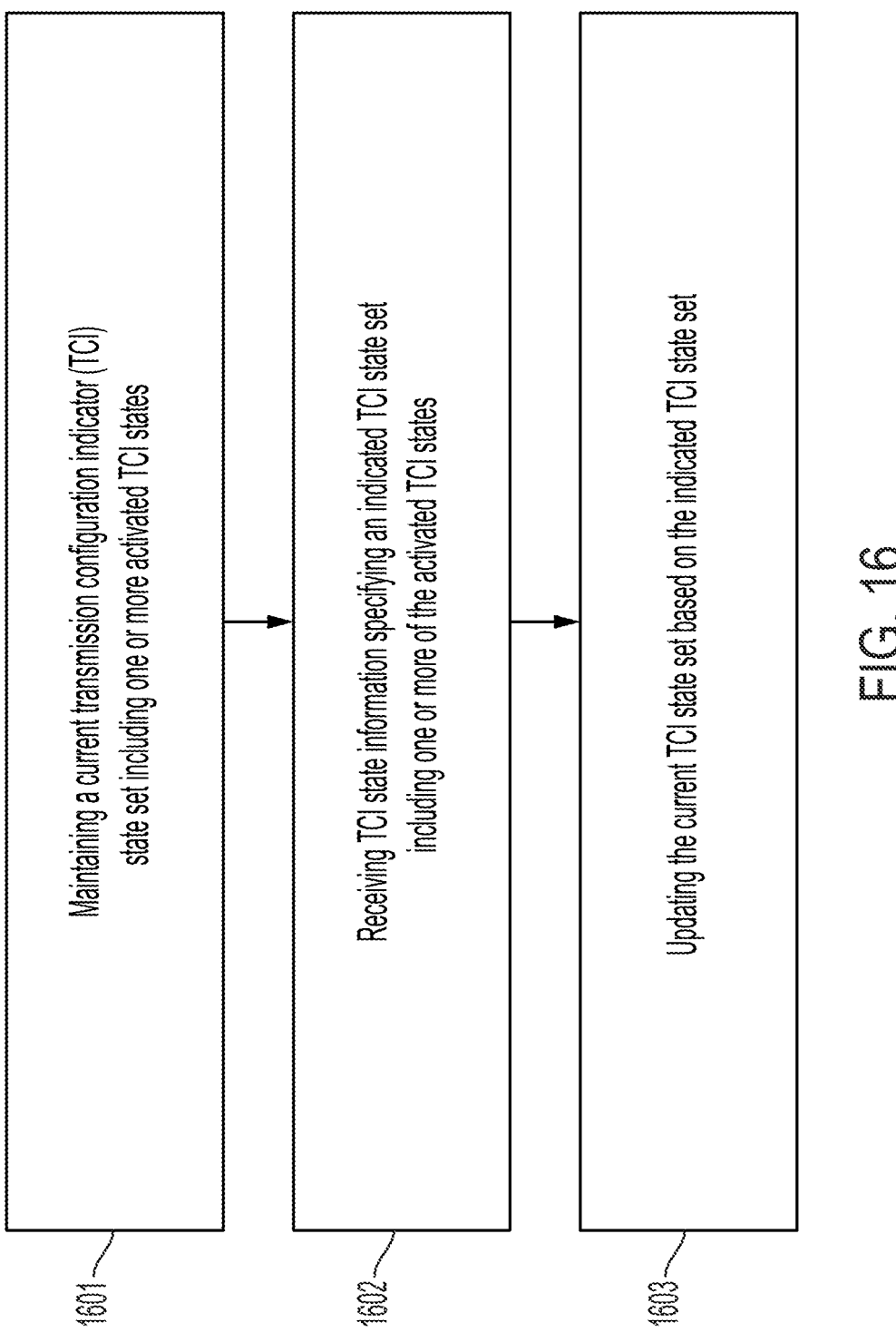

FIG. 16 illustrates an example method of communication between a UE and multi-TRPs, according to an embodiment. In particular, the example method of FIG. 16 includes UE behavior for TCI state bookkeeping. At 1601, the UE maintains a current transmission configuration indicator (TCI) state set including one or more activated TCI states. At 1602, the UE receives TCI state information specifying an indicated TCI state set including one or more of the activated TCI states. At 1603, the UE update the current TCI state set based on the indicated TCI state set.

FIG. 17 illustrates another example method of communication between a UE and multi-TRPs, according to an embodiment. In particular, the example method of FIG. 17 includes UE behavior for TCI state/TRP association. At 1701, the UE receives transmission configuration indicator (TCI) state information specifying an indicated TCI state set including one or more activated TCI states. At 1702, the UE receives an indication of association between the indicated TCI state set and one or more TRPs. At 1703, the UE identifies, based on the indication of association, one or more TRPs of the multi-TRPs to apply a configuration of the indicated TCI state set.

FIG. 18 illustrates another example method of communication between a UE and multi-TRPs, according to an embodiment. In particular, the example method of FIG. 18 includes UE behavior for applying a default TCI state. At 1801, the UE receives, from a TRP of the multi-TRPs, a dynamic control information (DCI) message scheduling reception of a physical downlink shared channel (PDSCH). At 1802, the UE determines that at least one of (a) or (b) applies: (a) the DCI message does not include transmission configuration indicator (TCI) state information, or (b) the DCI message schedules the PDSCH before a time duration for applying quasi co-location (QCL) information received in the DCI for PDSCH processing. At 1803, in response to determining that at least one of (a) or (b) applies, the UE determines a default TCI state. At 1804, the UE applies a configuration of the default TCI state to carry out at least one of uplink (UL) transmissions or downlink (DL) receptions with one or more TRPs of the multi-TRPs.

Figure 19:
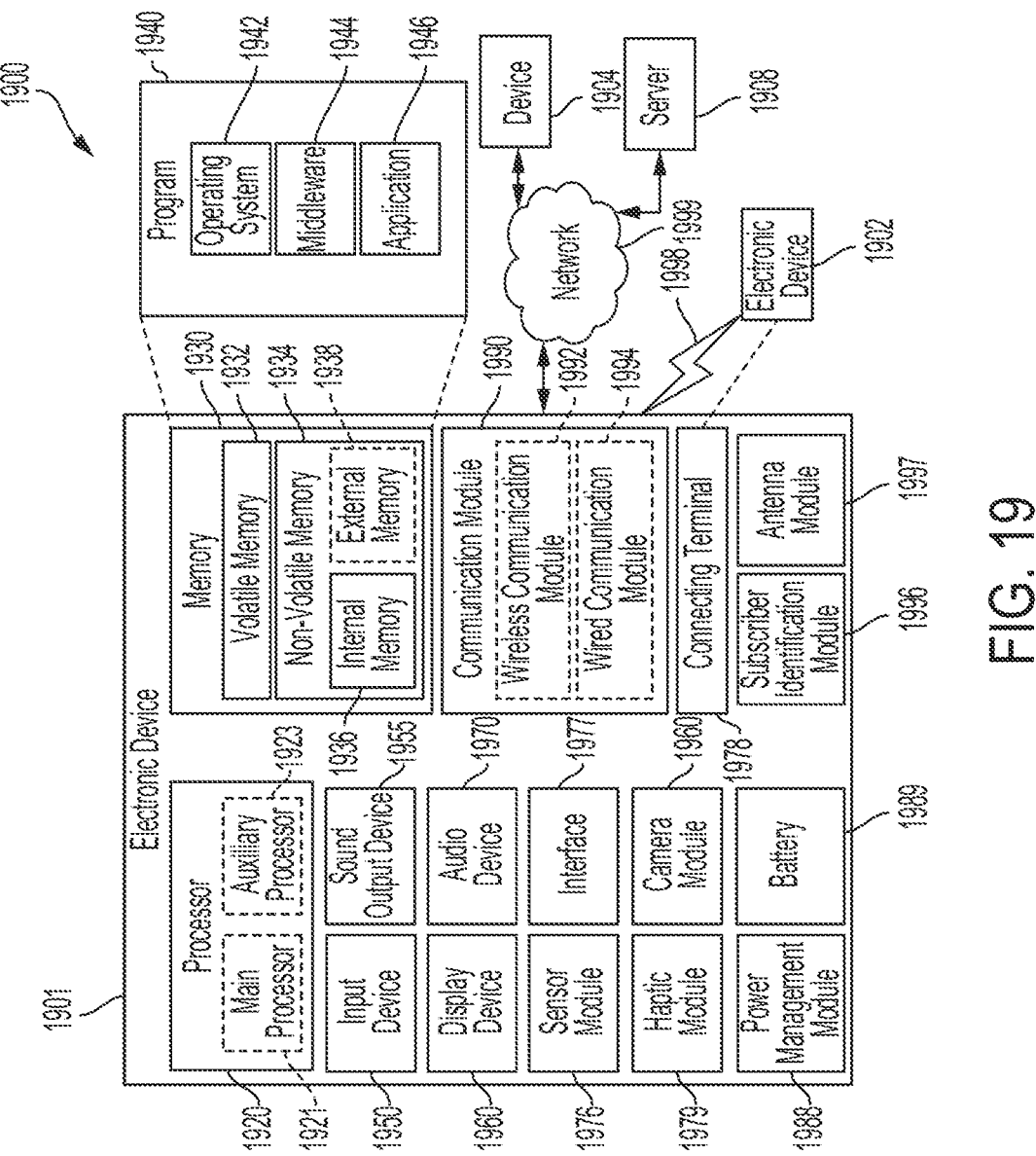
FIG. 19 is a block diagram of an electronic device in a network environment, according to an embodiment.

FIG. 19 is a block diagram of an electronic device in a network environment 1900, according to an embodiment. The electronic device of FIG. 19 may comprise the UE performing the functions and embodiments described herein, such as those illustrated in FIGS. 2 through 18.

Referring to FIG. 19, an electronic device 1901 in a network environment 1900 may communicate with an electronic device 1902 via a first network 1998 (e.g., a short-range wireless communication network), or an electronic device 1904 or a server 1908 via a second network 1999 (e.g., a long-range wireless communication network). The electronic device 1901 may communicate with the electronic device 1904 via the server 1908. The electronic device 1901 may include a processor 1920, a memory 1930, an input device 1950, a sound output device 1955, a display device 1960, an audio module 1970, a sensor module 1976, an interface 1977, a haptic module 1979, a camera module 1980, a power management module 1988, a battery 1989, a communication module 1990, a subscriber identification module (SIM) card 1996, or an antenna module 1997. In one embodiment, at least one (e.g., the display device 1960 or the camera module 1980) of the components may be omitted from the electronic device 1901, or one or more other components may be added to the electronic device 1901. Some of the components may be implemented as a single integrated circuit (IC). For example, the sensor module 1976 (e.g., a fingerprint sensor, an iris sensor, or an illuminance sensor) may be embedded in the display device 1960 (e.g., a display).

The processor 1920 may execute software (e.g., a program 1940) to control at least one other component (e.g., a hardware or a software component) of the electronic device 1901 coupled with the processor 1920 and may perform various data processing or computations.

As at least part of the data processing or computations, the processor 1920 may load a command or data received from another component (e.g., the sensor module 1976 or the communication module 1990) in volatile memory 1932, process the command or the data stored in the volatile memory 1932, and store resulting data in non-volatile memory 1934. The processor 1920 may include a main processor 1921 (e.g., a central processing unit (CPU) or an application processor (AP)), and an auxiliary processor 1923 (e.g., a graphics processing unit (GPU), an image signal processor (ISP), a sensor hub processor, or a communication processor (CP)) that is operable independently from, or in conjunction with, the main processor 1921. Additionally or alternatively, the auxiliary processor 1923 may be adapted to consume less power than the main processor 1921, or execute a particular function. The auxiliary processor 1923 may be implemented as being separate from, or a part of, the main processor 1921.

The auxiliary processor 1923 may control at least some of the functions or states related to at least one component (e.g., the display device 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). The auxiliary processor 1923 (e.g., an image signal processor or a communication processor) may be implemented as part of another component (e.g., the camera module 1980 or the communication module 1990) functionally related to the auxiliary processor 1923.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934. Non-volatile memory 1934 may include internal memory 1936 and/or external memory 1938.

The program 1940 may be stored in the memory 1930 as software, and may include, for example, an operating system (OS) 1942, middleware 1944, or an application 1946.

The input device 1950 may receive a command or data to be used by another component (e.g., the processor 1920) of the electronic device 1901, from the outside (e.g., a user) of the electronic device 1901. The input device 1950 may include, for example, a microphone, a mouse, or a keyboard.

The sound output device 1955 may output sound signals to the outside of the electronic device 1901. The sound output device 1955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1960 may visually provide information to the outside (e.g., a user) of the electronic device 1901. The display device 1960 may include, for example, a display, a hologram device, or a projector and control circuitry to control a corresponding one of the display, hologram device, and projector. The display device 1960 may include touch circuitry adapted to detect a touch, or sensor circuitry (e.g., a pressure sensor) adapted to measure the intensity of force incurred by the touch.

The audio module 1970 may convert a sound into an electrical signal and vice versa. The audio module 1970 may obtain the sound via the input device 1950 or output the sound via the sound output device 1955 or a headphone of an external electronic device 1902 directly (e.g., wired) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. The sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device 1902 directly (e.g., wired) or wirelessly. The interface 1977 may include, for example, a high-definition multimedia interface (HDMI), a universal serial bus (USB) interface, a secure digital (SD) card interface, or an audio interface.

A connecting terminal 1978 may include a connector via which the electronic device 1901 may be physically connected with the external electronic device 1902. The connecting terminal 1978 may include, for example, an HDMI connector, a USB connector, an SD card connector, or an audio connector (e.g., a headphone connector).

The haptic module 1979 may convert an electrical signal into a mechanical stimulus (e.g., a vibration or a movement) or an electrical stimulus which may be recognized by a user via tactile sensation or kinesthetic sensation. The haptic module 1979 may include, for example, a motor, a piezo-electric element, or an electrical stimulator.

The camera module 1980 may capture a still image or moving images. The camera module 1980 may include one or more lenses, image sensors, image signal processors, or flashes. The power management module 1988 may manage power supplied to the electronic device 1901. The power management module 1988 may be implemented as at least part of, for example, a power management integrated circuit (PMIC).

The battery 1989 may supply power to at least one component of the electronic device 1901. The battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more communication processors that are operable independently from the processor 1920 (e.g., the AP) and supports a direct (e.g., wired) communication or a wireless communication. The communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as BLUETOOTH™, wireless-fidelity (Wi-Fi) direct, or a standard of the Infrared Data Association (IrDA)) or the second network 1999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The antenna module 1997 may transmit or receive a signal or power to or from the outside (e.g., the external electronic device) of the electronic device 1901. The antenna module 1997 may include one or more antennas, and, therefrom, at least one antenna appropriate for a communication scheme used in the communication network, such as the first network 1998 or the second network 1999, may be selected, for example, by the communication module 1990 (e.g., the wireless communication module 1992). The signal or the power may then be transmitted or received between the communication module 1990 and the external electronic device via the selected at least one antenna.

Commands or data may be transmitted or received between the electronic device 1901 and the external electronic device 1904 via the server 1908 coupled with the second network 1999. Each of the electronic devices 1902 and 1904 may be a device of a same type as, or a different type, from the electronic device 1901. All or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1901. The electronic device 1901 may provide the outcome, with or without further processing of the outcome, as at least part of a reply to the request. To that end, a cloud computing, distributed computing, or client-server computing technology may be used, for example.

Figure 20:
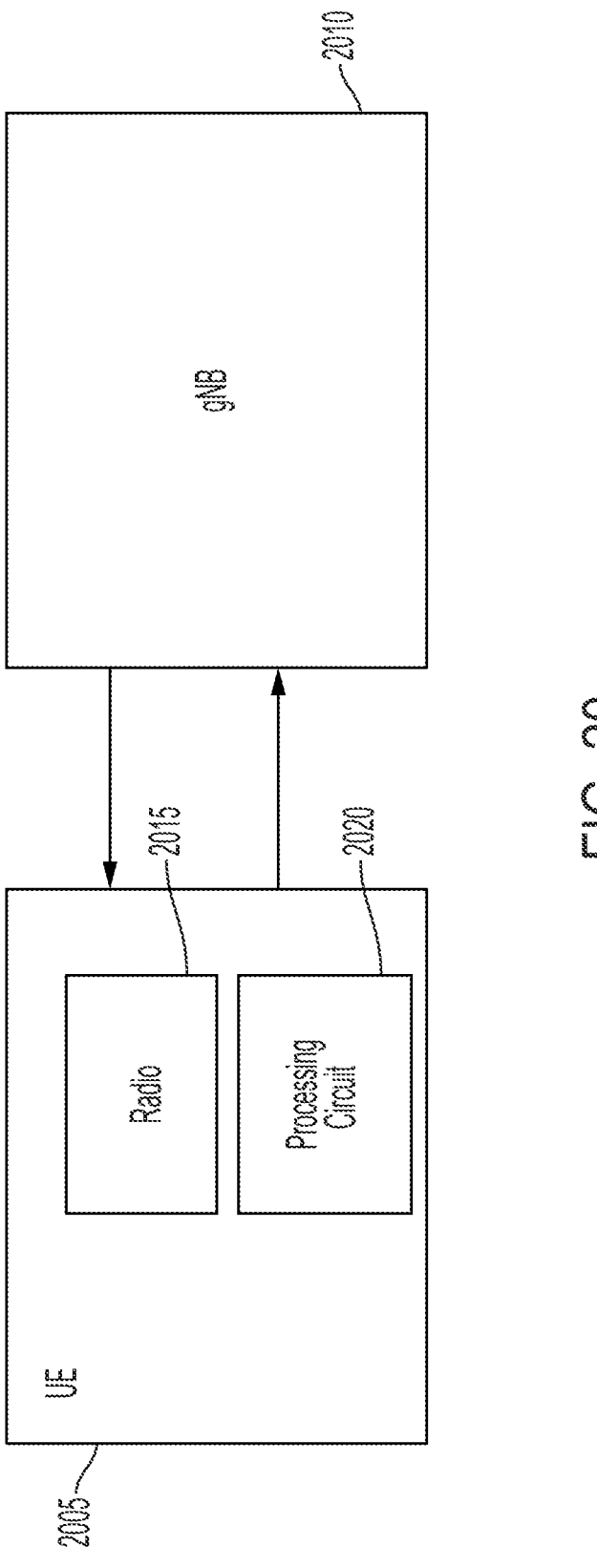
FIG. 20 shows a system including a UE and a gNB in communication with each other.

FIG. 20 shows a system including a UE 2005 and a gNB 2010, in communication with each other. The UE may include a radio 2015 and a processing circuit (or a means for processing) 2020, which may perform various methods disclosed herein, e.g., the methods illustrated in FIGS. 2 through 18. For example, the processing circuit 2020 may receive, via the radio 2015, transmissions from the network node (gNB) 2010, and the processing circuit 2020 may transmit, via the radio 2015, signals to the gNB 2010.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method of communicating with multiple transmission and reception points (multi-TRPs), the method comprising:
   maintaining, by a user equipment (UE), a current transmission configuration indicator (TCI) state set including one or more activated TCI states;
   receiving, by the UE, TCI state information specifying an indicated TCI state set including one or more of the activated TCI states; and
   updating, by the UE, the current TCI state set based on the indicated TCI state set.

2. The method of claim 1, further comprising:
   receiving, by the UE, a list of one or more TCI states via radio resource control (RRC) signaling;
   receiving, by the UE, a medium access control (MAC) control element (CE) command activating one or more TCI states from the list of TCI states; and
   applying, by the UE, a configuration of the current TCI state set to carry out at least one of uplink (UL) transmissions or downlink (DL) receptions with one or more TRPs of the multi-TRPs.

3. The method of claim 2, wherein:
   the current TCI state set includes a unified TCI state, and
   applying the configuration of the current TCI state set includes applying the unified TCI state to at least two different types of signals used to communicate with the one or more TRPs.

4. The method of claim 1, wherein:
   the current TCI state set includes one or more configurations, the indicated TCI state set specifies TCI states for only a proper subset of the configurations of the current TCI state set, and
   updating the current TCI state set updates only configurations of the current TCI state set specified by the indicated TCI state set, while maintaining existing configurations not specified by the indicated TCI state set.

5. The method of claim 1, wherein:
   the current TCI state set includes one or more configurations,
   the indicated TCI state set specifies TCI states for all the configurations of the current TCI state set, and
   updating the current TCI state set updates all of the configurations of the current TCI state set.

6. The method of claim 1, further comprising:
   determining, by the UE, whether the indicated TCI state set is a first type that specifies a proper subset of configurations of the current TCI state set or a second type that specifies all the configurations of the current TCI state set; and
   updating, by the UE, only configurations of the current TCI state set corresponding to the determined type of the indicated TCI state set, wherein the current TCI state set includes one or more configurations corresponding to the first type and one or more configurations corresponding to the second type.

7. The method of claim 2, wherein:
   the configuration of the current TCI state set includes quasi co-location (QCL) information associated with the one or more TRPs, and
   applying the configuration of the current TCI state set includes:
      determining, based on the QCL information, at least one of a pathloss reference signal (RS) or a power control parameter per bandwidth part (BWP) per UL channel, and
      applying the at least one pathloss RS or power control parameter to carry out UL transmissions with the one or more TRPs.

8. The method of claim 1, wherein:
   the UE receives the TCI state information via a dynamic control information (DCI) message that includes a TCI field conveying a codepoint value selected from a group of codepoint values including a first codepoint value mapped to a single activated TCI state and a second codepoint value mapped to multiple activated TCI states.

9. The method of claim 8, wherein:
   the UE carries out uplink (UL) transmissions or downlink (DL) receptions with a single TRP of the multi-TRPs in response to the TCI state information conveying the first codepoint value, and
   the UE carries out UL transmissions or DL receptions with a plurality of TRPs of the multi-TRPs in response to the TCI state information conveying the second codepoint value.

10. The method of claim 1, further comprising:
   carrying out, by the UE, semi-persistent scheduled (SPS) transmissions to and configured grant (CG) receptions from a single TRP of the multi-TRPs according to a single activated TCI state determined based on a radio resource control (RRC) configuration or a predefined rule.

11. The method of claim 1, further comprising:

receiving, by the UE, a dynamic control information (DCI) message scheduling reception of a physical downlink shared channel (PDSCH);

determining, by the UE, that both (a) and (b) apply:
(a) the UE does not support a capability of two default TCI states, and
(b) the DCI message schedules the PDSCH before a time duration for applying QCL information received in the DCI for PDSCH processing; and in response to determining that both (a) and (b) apply:

identifying, by the UE and based on at least one of a pre-defined rule, an RRC indication, or a MAC CE indication, one or more TRPs to apply a configuration of the current TCI state set.

12. The method of claim 1, further comprising:

receiving, by the UE, a dynamic control information (DCI) message scheduling reception of a physical downlink shared channel (PDSCH);

monitoring, by the UE, one or more core resource sets (CORESETs) with respect to the scheduled PDSCH;

receiving, by the UE, indication of a reference CORESET among the monitored CORESETs;

determining, by the UE, that both (a) and (b) apply:
(a) the UE does not support a capability of two default TCI states, and
(b) the DCI message schedules the PDSCH before a time duration for applying QCL information received in the DCI for PDSCH processing; and in response to determining that both (a) and (b) apply:

identifying, by the UE and based on the reference CORE-SET, one or more trans TRPs to apply a configuration of the current TCI state set.

13. A user equipment (UE) device comprising:

a processor;

a memory including instructions which, when executed by the processor, cause the UE device to:

maintain a current transmission configuration indicator (TCI) state set including one or more activated TCI states;

receive TCI state information specifying an indicated TCI state set including one or more of the activated TCI states; and update the current TCI state set based on the indicated TCI state set.

14. The UE device of claim 13, wherein the instructions, when executed by the processor, further cause the UE device to:

receive a list of one or more TCI states via radio resource control (RRC) signaling;

receive a medium access control (MAC) control element (CE) command activating one or more TCI states from the list of TCI states; and apply a configuration of the current TCI state set to carry out at least one of uplink (UL) transmissions or down-link (DL) receptions with one or more transmission and reception points (TRPs) of multiple TRPs (multi-TRPs).

15. The UE device of claim 14, wherein:

the current TCI state set includes a unified TCI state, and applying the configuration of the current TCI state set includes applying the unified TCI state to at least two different types of signals used to communicate with the one or more TRPs.

16. The UE device of claim 13, wherein:

the current TCI state set includes one or more configu-rations, the indicated TCI state set specifies TCI states for only a proper subset of the configurations of the current TCI state set, and updating the current TCI state set updates only configu-rations of the current TCI state set specified by the indicated TCI state set, while maintaining existing configurations not specified by the indicated TCI state set.

17. The UE device of claim 13, wherein:

the current TCI state set includes one or more configu-rations, the indicated TCI state set specifies TCI states for all the configurations of the current TCI state set, and updating the current TCI state set updates all of the configurations of the current TCI state set.

18. The UE device of claim 13, wherein the instructions, when executed by the processor, further cause the UE device to:

determine whether the indicated TCI state set is a first type that specifies a proper subset of configurations of the current TCI state set or a second type that specifies all the configurations of the current TCI state set; and update only configurations of the current TCI state set corresponding to the determined type of the indicated TCI state set, wherein the current TCI state set includes one or more configurations corresponding to the first type and one or more configurations corresponding to the second type.

19. The UE device of claim 14, wherein:

the configuration of the current TCI state set includes quasi co-location (QCL) information associated with the one or more TRPs, applying the configuration of the current TCI state set includes:

determining, based on the QCL information, at least one of a pathloss reference signal (RS) or a power control parameter per bandwidth part (BWP) per UL channel, and applying the at least one pathloss RS or power control parameter to carry out UL transmissions with the one or more TRPs.

20. The UE device of claim 13, wherein:

the UE device receives the TCI state information via a dynamic control information (DCI) message that includes a TCI field conveying a codepoint value selected from a group of codepoint values including a first codepoint value mapped to a single activated TCI state and a second codepoint value mapped to multiple activated TCI states.

21. The UE device of claim 20, wherein the instructions, when executed by the processor, further cause the UE device to:

carry out uplink (UL) transmissions or downlink (DL) receptions with a single transmission and reception point (TRP) of multiple TRPs (multi-TRPs) in response to the TCI state information conveying the first code-point value, and carry out UL transmissions or DL receptions with a plurality of TRPs of the multi-TRPs in response to the TCI state information conveying the second codepoint value.

22. The UE device of claim 13, wherein the instructions, when executed by the processor, further cause the UE device to:

carry out semi-persistent scheduled (SPS) transmissions to and configured grant (CG) receptions from a single transmission and reception point (TRP) of multiple TRPs (multi-TRPs) according to a single activated TCI state determined based on a radio resource control (RRC) configuration or a predefined rule.

23. The UE device of claim 13, wherein the instructions, when executed by the processor, further cause the UE device to:

receive a dynamic control information (DCI) message scheduling reception of a physical downlink shared channel (PDSCH);

determine that both (a) and (b) apply:

(a) the UE does not support a capability of two default TCI states, and (b) the DCI message schedules the PDSCH before a time duration for applying QCL information received in the DCI for PDSCH processing; and in response to determining that both (a) and (b) apply:

identify, based on at least one of a pre-defined rule, an RRC indication, or a MAC CE indication, one or more transmission and reception points (TRPs) of multiple TRPs (multi-TRPs) to apply a configuration of the current TCI state set.

24. The UE device of claim 13, wherein the instructions, when executed by the processor, further cause the UE device to:

receive a dynamic control information (DCI) message scheduling reception of a physical downlink shared channel (PDSCH);

monitor one or more core resource sets (CORESETs) with respect to the scheduled PDSCH;

receive indication of a reference CORESET among the monitored CORESETs;

determine that both (a) and (b) apply:

(a) the UE does not support a capability of two default TCI states, and (b) the DCI message schedules the PDSCH before a time duration for applying QCL information received in the DCI for PDSCH processing; and in response to determining that both (a) and (b) apply:

identify, based on the reference CORESET, one or more transmission and reception points (TRPs) of multiple TRPs (multi-TRPs) to apply a configuration of the current TCI state set.

* * * * *